United States Patent
Ha et al.

(10) Patent No.: US 9,408,110 B2
(45) Date of Patent: Aug. 2, 2016

(54) APPARATUS AND METHOD FOR HANDLING ERROR FOR SERVICE FLOW MODIFICATION A BROADBAND WIRELESS COMMUNICATION NETWORK

(75) Inventors: Yoon-Jeong Ha, Seongnam-si (KR); Ki-Back Kim, Seoul (KR); Kwon-Young Kim, Gwacheon-si (KR); Hyung-Seok Ha, Seoul (KR); Jae-Jeong Shim, Seongnam-si (KR); Jung-Shin Park, Seoul (KR); Han-Kyung Lee, Yongin-si (KR); Chang-Yeon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 994 days.

(21) Appl. No.: 12/653,504

(22) Filed: Dec. 15, 2009

(65) Prior Publication Data

US 2010/0157814 A1    Jun. 24, 2010

(30) Foreign Application Priority Data

Dec. 18, 2008    (KR) .......................... 10-2008-0129014

(51) Int. Cl.
| | |
|---|---|
| *H04L 12/26* | (2006.01) |
| *H04W 28/24* | (2009.01) |
| *H04L 12/24* | (2006.01) |
| *H04W 28/22* | (2009.01) |

(52) U.S. Cl.
CPC .......... *H04W 28/24* (2013.01); *H04L 41/0893* (2013.01); *H04L 41/5003* (2013.01); *H04W 28/22* (2013.01)

(58) Field of Classification Search
USPC .......................... 370/229, 235, 236, 241, 242
See application file for complete search history.

(56) References Cited

U.S. PATENT DOCUMENTS

| | | | | |
|---|---|---|---|---|
| 7,899,024 | B2 * | 3/2011 | Chou ............................ | 370/348 |
| 8,165,074 | B2 * | 4/2012 | Maas ............................ | 370/329 |
| 8,223,797 | B2 * | 7/2012 | Liang et al. ................... | 370/474 |
| 8,229,391 | B2 * | 7/2012 | Liang et al. ................ | 455/404.1 |
| 8,406,212 | B2 * | 3/2013 | Liu et al. ....................... | 370/349 |

(Continued)

FOREIGN PATENT DOCUMENTS

| | | |
|---|---|---|
| KR | 2000 0038086 A | 7/2000 |
| KR | 2008 0082318 A | 9/2008 |
| WO | WO 2007/107123 A1 | 9/2007 |

OTHER PUBLICATIONS

Notice of Patent Grant dated May 18, 2015 in connection with Korean Patent Application No. 10-2008-0129014, 8 pages.

*Primary Examiner* — Feben M Haile

(57) ABSTRACT

A network includes a Mobile Station (MS) for sending a Service Flow (SF) modification request message to a Base Station (BS) to modify an SF. The BS sends a path modification request message to a serving SF Authorization (SFA) when there is the information on the SF. The BS also sends an SF modification response message comprising a Confirmation Code 'Reject SF not found' to the MS when there is no information on the SF. The serving SFA sends a resource reservation request message to an anchor SFA when there is the information on the SF, and sends a path modification response message comprising a Failure Indication (FI) 'Requested Context Unavailable' to the BS when there is no information on the SF. The anchor SFA sends a resource reservation response message comprising the FI 'Requested Context Unavailable' to the serving SFA when there is no information on the SF.

20 Claims, 31 Drawing Sheets

(56) References Cited

U.S. PATENT DOCUMENTS

| | | |
|---|---|---|
| 2008/0219205 A1 | 9/2008 | Kang et al. |
| 2008/0232254 A1* | 9/2008 | Chhaya et al. .............. 370/236 |
| 2008/0253342 A1* | 10/2008 | So et al. .................... 370/338 |
| 2008/0273520 A1* | 11/2008 | Kim et al. ................... 370/345 |
| 2009/0052390 A1* | 2/2009 | Gu et al. ..................... 370/329 |
| 2009/0080374 A1* | 3/2009 | Lee et al. .................... 370/328 |
| 2009/0080422 A1* | 3/2009 | Lee et al. .................... 370/389 |

* cited by examiner

APPARATUS AND METHOD FOR HANDLING ERROR FOR SERVICE FLOW MODIFICATION A BROADBAND WIRELESS COMMUNICATION NETWORK

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Dec. 18, 2008 and assigned Serial No. 10-2008-0129014, the entire disclosure of which is hereby incorporated by reference.

TECHNICAL FIELD OF THE INVENTION

The present invention relates generally to a broadband wireless communication network. More particularly, the present invention relates to an apparatus and a method for handling error occurring in Service Flow (SF) modification in the broadband wireless communication network.

BACKGROUND OF THE INVENTION

In conventional circuit-based wireless communication networks adopting Code Division Multiple Access (CDMA) scheme or Global System for Mobile communications (GSM) scheme, required capacity and radio resource consumption for one connection are constant. However, in Internet Protocol (IP)-based wireless communication networks that are drawing attention as a future communication system, such as Worldwide Interoperability for Microwave Access (WiMAX), one terminal can include a plurality of Service Flows (SFs). The SF parameters can be modified according to requirements of a user or an application program. When the parameters are modified, Quality of Service (QoS) of the SF should be guaranteed.

To ensure the QoS, systematic control is required to manage the SF between all layers configuring the wireless communication network. However, Institute of Electrical and Electronics Engineers (IEEE) 802.16 standard and Network Working Group (NWG) standard adopted in the WiMAX system do not define detailed interworking processes for the SF parameter modification. In particular, no definition exists for the processes which handle the failure of Dynamic Service Change (DSC) process in a Media Access Control (MAC) layer and modifies the parameters in the upper layer. In this respect, to guarantee the steady QoS, a detailed interworking process for modifying the SF parameters and a process for handling error are demanded.

SUMMARY OF THE INVENTION

To address the above-discussed deficiencies of the prior art, it is a primary aspect of the present invention to provide an apparatus and a method for modifying Service Flow (SF) parameters in a broadband wireless communication network.

Another aspect of the present invention is to provide an apparatus and a method for handling error in SF parameter modification in a broadband wireless communication network.

Yet another aspect of the present invention is to provide an apparatus and a method for deleting an SF when there is no SF in a certain Network Entity (NE) of a broadband wireless communication network.

Still another aspect of the present invention is to provide an apparatus and a method for restoring an SF when SF parameter modification fails in a broadband wireless communication network.

A further aspect of the present invention is to provide an apparatus and a method for deleting an SF when a timer expires in a broadband wireless communication network.

According to one aspect of the present invention, a broadband wireless communication network for supporting a Mobile Station (MS) initiated SF parameter modification process includes an MS configured to send an SF modification request message to a Base Station (BS) to modify an SF. The BS is configured to determining whether there is information relating to the SF upon receiving the SF parameter modification request message. The BS also is configured to send a path modification request message to a serving Service Flow Authorization (SFA) when there is the information on the SF, and send an SF modification response message which comprises a Confirmation Code (CC) 'Reject SF not found' to the MS when there is no information on the SF. The serving SFA is configured to determine whether there is information on the SF upon receiving the path modification request message, send a resource reservation request message to an anchor SFA when there is the information on the SF, and send a path modification response message which comprises a Failure Indication (FI) 'Requested Context Unavailable' to the BS when there is no information on the SF. An anchor SFA is configured to determine whether information exists on the SF upon receiving the resource reservation request message, and send a resource reservation response message which comprises the FI 'Requested Context Unavailable' to the serving SFA when there is no information on the SF.

According to another aspect of the present invention, an operating method of an MS in a broadband wireless communication network includes sending an SF modification request message to a BS to modify an SF; starting a timer corresponding to the SF modification request message at the same time as sending the SF modification request message; and when the timer expires before an SF modification response message is received from the BS, proceeding with an MS initiated SF deletion process.

According to yet another aspect of the present invention, an operating method of a BS in a broadband wireless communication network includes determining whether is information of SF upon receiving an SF parameter modification request message; when there is the information on the SF, sending a path modification request message to a serving SFA; and when there is no information on the SF, sending an SF modification response message which comprises a CC 'Reject SF not found' to a Mobile Station (MS).

According to still another aspect of the present invention, an operating method of an Access Service Network GateWay (ASN-GW) that acts as a serving SFA in a broadband wireless communication network includes: when receiving a path modification request message for modifying an SF from a BS, determining whether there is information on the SF; when there is the information on the SF, sending a resource reservation request message to an anchor SFA; and when there is no information on the SF, sending a path modification response message which comprises an FI 'Requested Context Unavailable' to the BS.

According to a further aspect of the present invention, an operating method of an Access Service Network GateWay (ASN-GW) that acts as an anchor SFA in a broadband wireless communication network includes: when receiving a resource reservation request message for modifying an SF from a serving SFA, determining whether there is information on the SF; and when there is no information on the SF, sending a resource reservation response message comprising an FI 'Requested Context Unavailable' to the serving SFA.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 31, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

Exemplary embodiments of the present invention provide a technique for modifying Service Flow (SF) parameters in a broadband wireless communication network. Hereinafter, a wireless communication system adopting Orthogonal Frequency Division Multiplexing (OFDM)/Orthogonal Frequency Division Multiple Access (OFDMA) scheme in the physical layer is illustrated by way of example. However, the present invention is applicable to other wireless communication networks.

Figure 1:
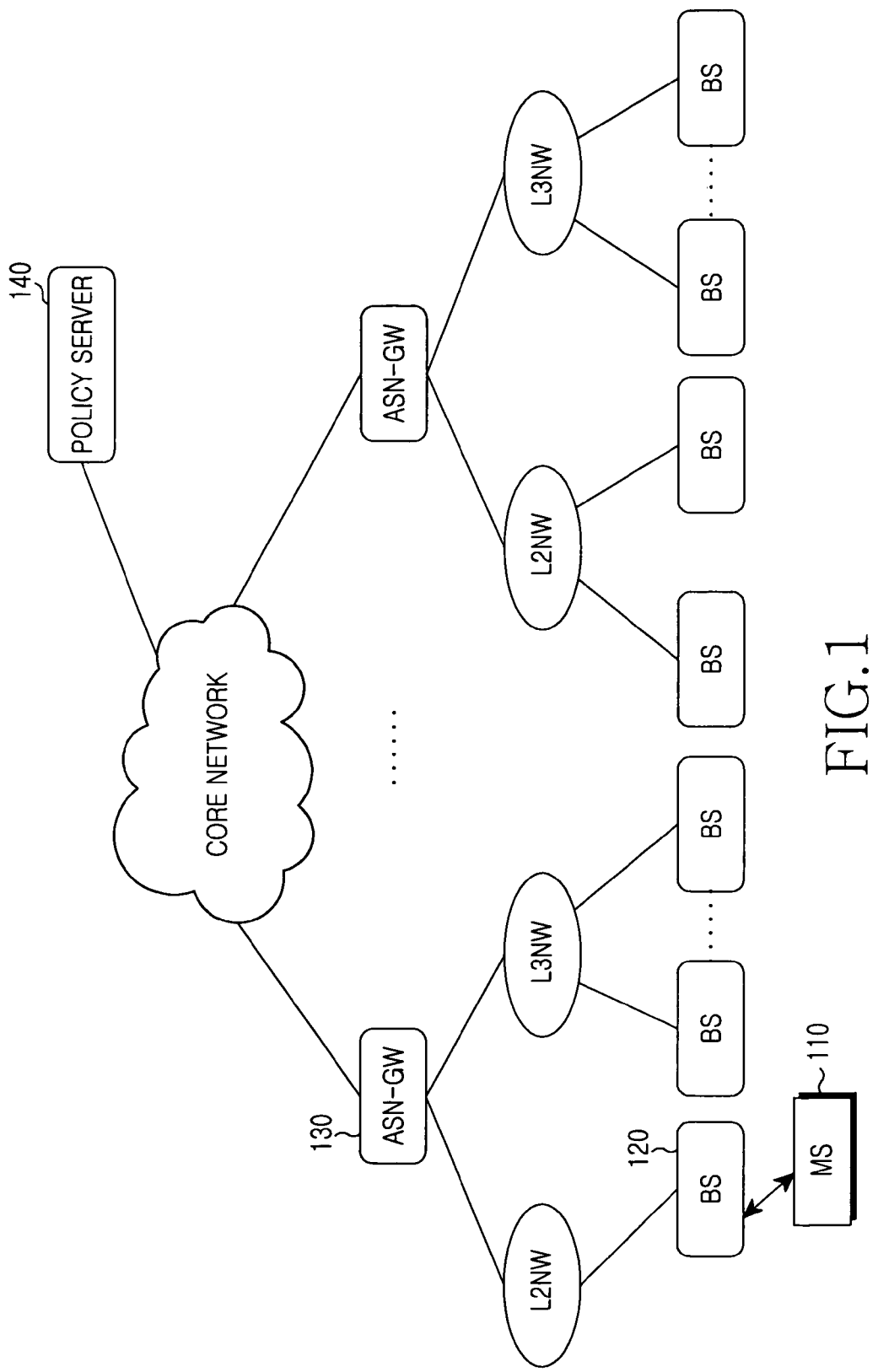
FIG. 1 illustrates a structure of a broadband wireless communication network according to an exemplary embodiment of the present invention.

FIG. 1 illustrates a structure of a broadband wireless communication network according to an exemplary embodiment of the present invention.

The broadband wireless communication network of FIG. 1 includes a Mobile Station (MS) 110, a Base Station (BS) 120, an Access Service Network GateWay (ASN-GW) 130, and a policy server 140.

The MS 110 is terminal equipment for a user to access the network and use the service. The BS 120 is configured to manage radio resources for the network access of the MS. The ASN-GW 130 is configured to function as a gateway of a subnet including a plurality of BSs. That is, the ASN-GW 130 acts as the upper node of the multiple BSs. The ASN-GW 130 manages connection and mobility of the MS 110. In particular, the ASN-GW 130 includes a Service Flow Authorization (SFA) function that manages the SF. Herein, the SF is generated by separating the uplink and the downlink.

The policy server 140 determines SF parameters of a wireless Access Network (AN) by reflecting the policy of a system provider for Quality of Service (QoS). The policy server 140, which is the functional element, can be configured as an independent server or belong to other network entity as one function. For example, an Internet Protocol (IP) Multimedia Subsystem (IMS) server conforming to Session Initiate Protocol (SIP) can include the policy server 140. In this case, Proxy-Call State Control Function (P-CSCF) of the IMS server and the policy server 140 can constitute one server. The P-CSCF is the function block of the IMS for receiving an SIP message from the user and can be called an interface block. Herein, the policy server 140 can be split into two objects of Policy Charging Rule Function (PCRF) and Policy Decision Function (PDF).

To facilitate the understanding about a solution for handling error according to an exemplary embodiment of the present invention, the normal SF parameter modification process is explained. The SF parameter modification process can be initiated by the MS or by an anchor SFA. Hereafter, the process initiated by the MS is referred to as an MS initiated process, and the process initiated by the anchor SFA is referred to as a network initiated process.

Figure 2:
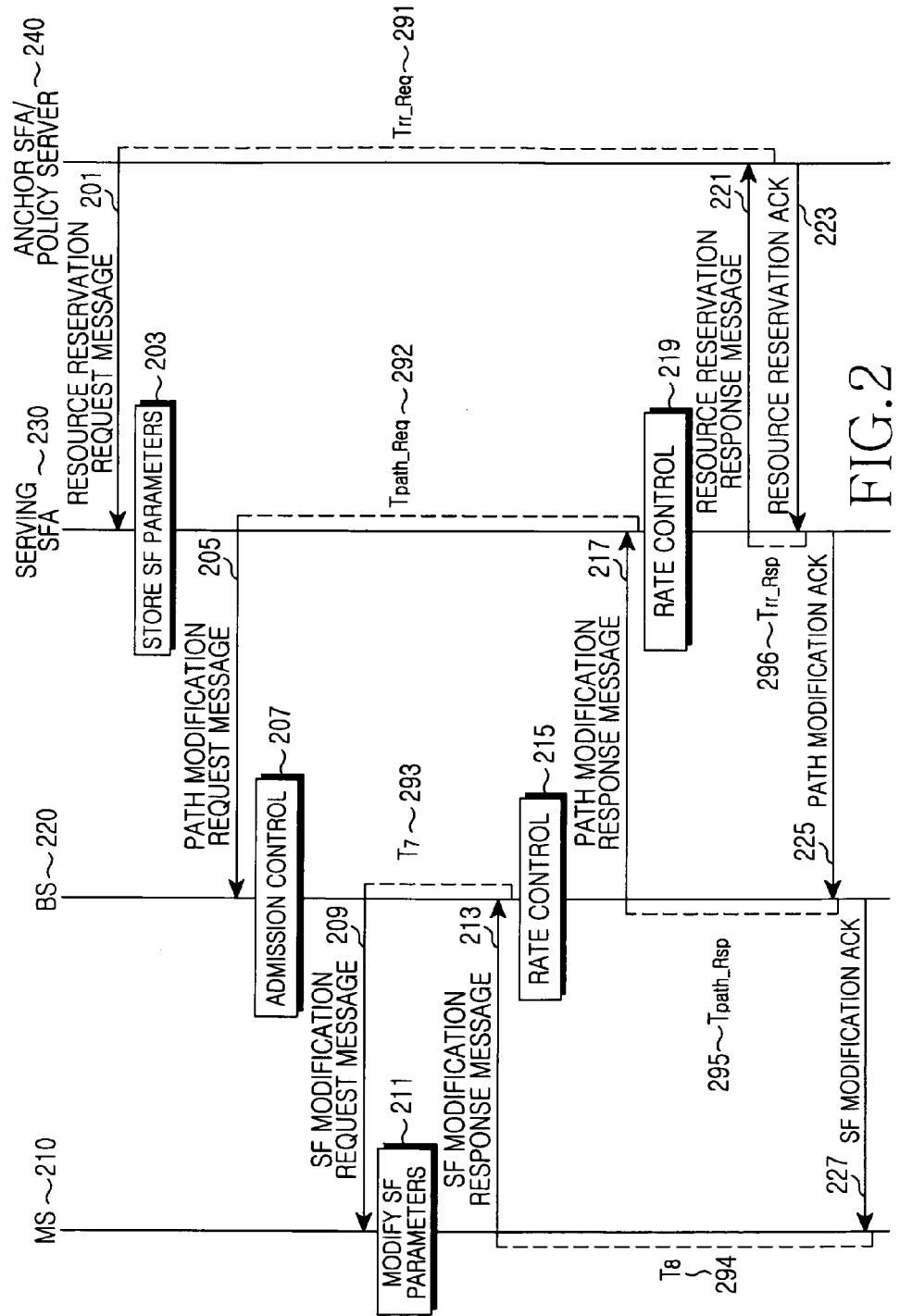
FIG. 2 illustrates signal exchanges for network initiated Service Flow (SF) parameter modification in the broadband wireless communication network according to an exemplary embodiment of the present invention.

FIG. 2 illustrates signal exchanges for the network initiated SF parameter modification in the broadband wireless communication network according to an exemplary embodiment of the present invention.

The anchor SFA/policy server 240 sends a Resource Reservation REQuest (RR_REQ) message to a service SFA 230 in step 201. The RR_REQ message is used to manage the SF between the SFAs and includes information such as identification information pointing the SF to modify, bandwidth, bit error rate, and service type.

The service SFA 230 receiving the RR_REQ message stores SF parameters confirmed from the RR_REQ message in step 203 and sends a Path_Modification_REQ message to the BS 220 in step 205. The Path_Modification_REQ message is used to manage the SF between the SFA and the BS and includes identification information pointing the SF to change, IDs of the Network Entities (NEs) associated with the corresponding SF, and SF parameters.

The BS 220 receiving the Path_Modification_REQ message performs admission control based on the SF parameters of the Path_Modification_REQ message in step 207 and sends an SF modification request (Dynamic Service Change (DSC)-REQ) message to the MS 210 in step 209. Herein, the admission control is the process for the BS 220 to determine whether to admit the modified SF, and takes into account the MS being accessed, available resource amount, and service type allowed to the corresponding MS. The SF modification request (DSC-REQ) message is utilized to change the SF between the BS and the MS and includes identification information indicating the SF to change and SF parameters of the Media Access Control (MAC) layer.

Upon receiving the SF modification message (DSC-REQ) message, the MS 210 modifies the SF parameters according to the SF modification request (DSC-REQ) message in step 211 and sends an SF modification response (DSC-ReSPonse (RSP)) message to the BS 220 in step 213. Recognizing the success of the SF parameter modification by receiving the SF modification response (DSC-RSP) message, the BS 220 performs the rate control in step 215 and sends a Path_Modification_RSP message to the service SFA 230 in step 217. Herein, the rate control indicates the process of distributing the rate resource with respect to the determined SF parameters.

Recognizing the success of the SF parameter modification by receiving the Path_Modification_RSP message, the serving SFA 230 performs the rate control in step 219 and sends a Resource Reservation (RR_RSP message to the anchor SFA/policy server 240 in step 221. The anchor SFA/policy server 240, receiving the RR_RSP message and recognizing the success of the SF parameter modification, sends an RR_ACKnowledge (ACK) to the serving SFA 230 in step 223. The serving SFA 230 sends a Path_Modification_ACK to the BS 220 in step 225. The BS 220 sends an SF modification ACK (DSC-ACK) to the MS 210 in step 227. Thus, the MS 210, the BS 220, the serving SFA 230, and the anchor SFA/policy server 240 recognize the successful SF parameter modification in every object of the network.

Figure 3:
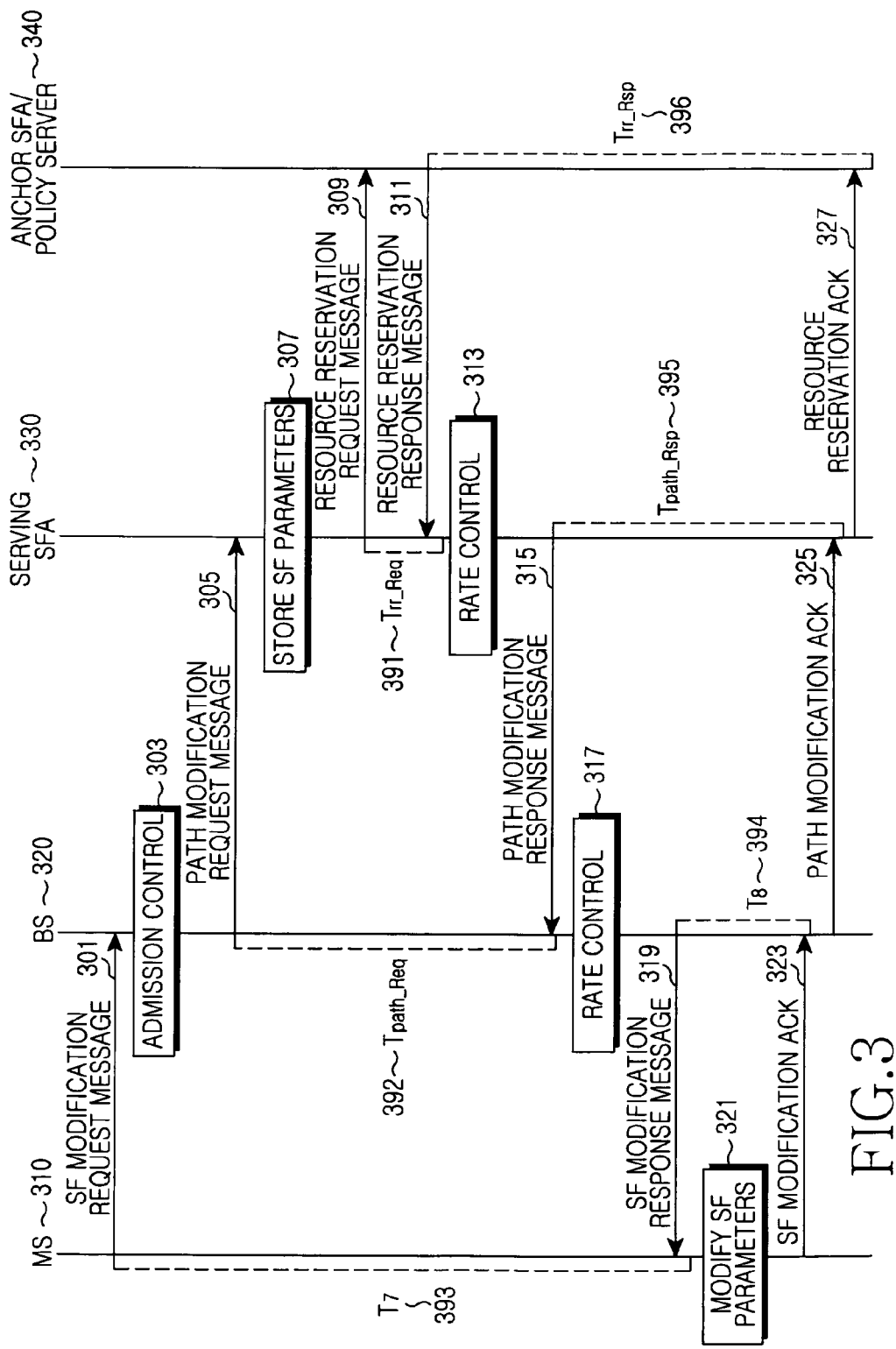
FIG. 3 illustrates signal exchanges for Mobile Station (MS) initiated SF parameter modification in the broadband wireless communication network according to an exemplary embodiment of the present invention.

FIG. 3 illustrates signal exchanges for the MS initiated SF parameter modification in the broadband wireless communication network according to an exemplary embodiment of the present invention.

The MS 310 sends the SF modification request (DSC-REQ) message to the BS 320 in step 301. The SF modification request (DSC-REQ) message is utilized to change the SF between the BS and the MS and includes the SF parameters of the MAC layer. The BS 320 receiving the SF modification request (DSC-REQ) message performs the admission control based on the SF parameters of the SF modification request (DSC-REQ) message in step 303 and sends a Path_Modification_REQ message to the serving SFA 330 in step 305. Herein, the admission control is the process for the BS 320 to determine whether to admit the modified SF, and takes into account the MS being accessed, available resource amount, and service type allowed to the corresponding MS. The Path_Modification_REQ message is used to manage the SF between the SFA and the BS and includes IDs of NEs associated with the corresponding SF and the SF parameters.

The serving SFA 330 receiving the Path_Modification_REQ message stores the SF parameters confirmed from the Path_Modification_REQ message in step 307 and sends an RR_REQ message to the anchor SFA/policy server 340 in step 309. The RR_REQ message is used to manage the SF between the SFAs and includes information such as bandwidth, bit error rate, and service type.

Upon receiving the RR_REQ message, the anchor SFA/policy server 340 confirms the request of the SF parameter modification and sends an RR_RSP message to the serving SFA 330 in step 311. The serving SFA 330, which receives the RR_RSP message and recognizes the success of the SF parameter modification, performs the rate control in step 313 and sends a Path_Modification_RSP message to the BS 320 in step 315. Herein, the rate control indicates the process for distributing the rate resource to the determined SF parameters.

Upon receiving the Path_Modification_RSP message and recognizing the success of the SF parameter modification, the BS 320 performs the rate control in step 317 and sends an SF modification response (DSC-RSP) message to the MS 310 in step 319. The MS 310, which receives the SF modification response (DSC-RSP) message and recognizes the success of the SF parameter modification, changes the SF parameters in step 321 and sends an SF modification ACK (DSC-ACK) to the BS 320 in step 323. Accordingly, the BS 320 receiving the SF modification ACK (DSC-ACK) sends a Path_Modification_ACK to the serving SFA 330 in step 325, and the serving SFA 330 sends an RR_ACK to the anchor SFA/policy server 340 in step 327. Consequently, the MS 310, the BS 320, the serving SFA 330, and the anchor SFA/policy server 340 recognize the successful SF parameter modification in every object of the network.

The SF parameters are modified through the processes of FIGS. 2 and 3. As shown in FIGS. 2 and 3, timers $T_{rr\_Req}$ 291 and 391, $T_{path\_Req}$ 292 and 392, $T_7$ 293 and 393, $T_8$ 294 and 394, $T_{path\_Rsp}$ 295 and 395, and $T_{rr\_Rsp}$ 296 and 396 are employed. $T_{rr\_Req}$ 291 and 391 is the timer measuring the time waiting for the RR_RSP message after the RR_REQ message is transmitted. $T_{path\_Req}$ 292 and 392 is the timer measuring the time waiting for the Path_Modification_RSP message after the Path_Modification_REQ message is transmitted. $T_7$ 293 and 393 is the timer measuring the time waiting for the SF modification response (DSC-RSP) message after the SF modification request (DSC-REQ) message is transmitted. $T_8$ 294 and 394 is the timer measuring the time waiting for the SF modification ACK (DSC-ACK) message after the SF modification response (DSC-RSP) message is transmitted. $T_{path\_Rsp}$ 295 and 395 is the timer measuring the time waiting for the Path_Modification_ACK after the Path_Modification_RSP message is transmitted. $T_{rr\_Rsp}$ 296 and 396 is the timer measuring the time waiting for the RR_ACK after the RR_RSP message is transmitted.

In process of the SF parameter modification of FIGS. 2 and 3, abnormality of the SF parameter modification process is either error of the SF or failure of the SF parameter modification. The error of the SF implies the inconsistent status of the corresponding SF among the NEs in the network, and the failure of the SF parameter modification implies that at least one of the messages of FIGS. 2 and 3 is lost and the SF parameter modification is not completed.

Herein, when the SF parameter modification fails, the SF enters one of three status: that is, the SF is irrecoverable and deleted; the SF parameters before the modification process are sustained; or the parameters are inconsistent because of irrecoverableness or timer expiration.

When the MS or the anchor SFA, which carries out the SF parameter modification process, holds the SF but the other NE participating in the SF parameter modification process has no SF, the NE cannot send the message for the SF parameter modification process. Namely, the SF parameter modification process cannot proceed. In this situation, the SF modification response (DSC-RSP) message including a Confirmation Code (CC) 'Reject-SF-not-found', the RR_RSP message and the Path_Modification_RSP message including a Failure Indication (FI) 'Requested Context Unavailable' are transmitted. The NE receiving the SF modification response message, the RR_RSP message, or the Path_Modification_RSP message deletes the SF. The SF deletion due to the inconsistent presence of the SF is now described in detail.

FIGS. 4 through 9 illustrate signal exchanges when the SF is deleted because of its absence in the SF parameter modification process of the broadband wireless communication network according to an exemplary embodiment of the present invention.

Figure 4:
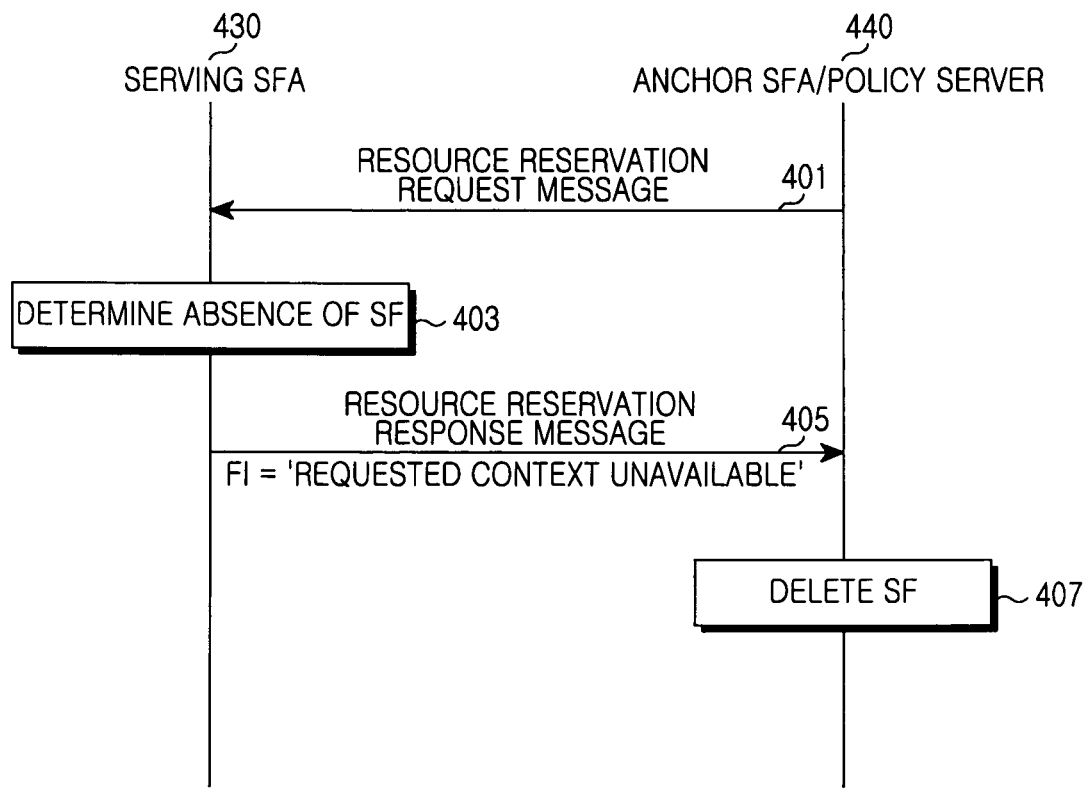
FIGS. 4 through 9 illustrate signal exchanges when the SF is deleted because of the absence of the SF in the SF parameter modification of the broadband wireless communication network according to an exemplary embodiment of the present invention.

FIG. 4 shows the signal exchanges when the serving SFA includes no SF in the network initiated SF parameter modification. The anchor SFA/policy server 440 sends the RR_REQ message in step 401 and the serving SFA 430 determines the absence of the SF indicated by the RR_REQ message in step 403. Therefore, the serving SFA 430 sends the RR_RSP message including the FI 'Requested Context Unavailable' in step 405. The anchor SFA/policy server 440 deletes the SF in step 407.

Figure 5:
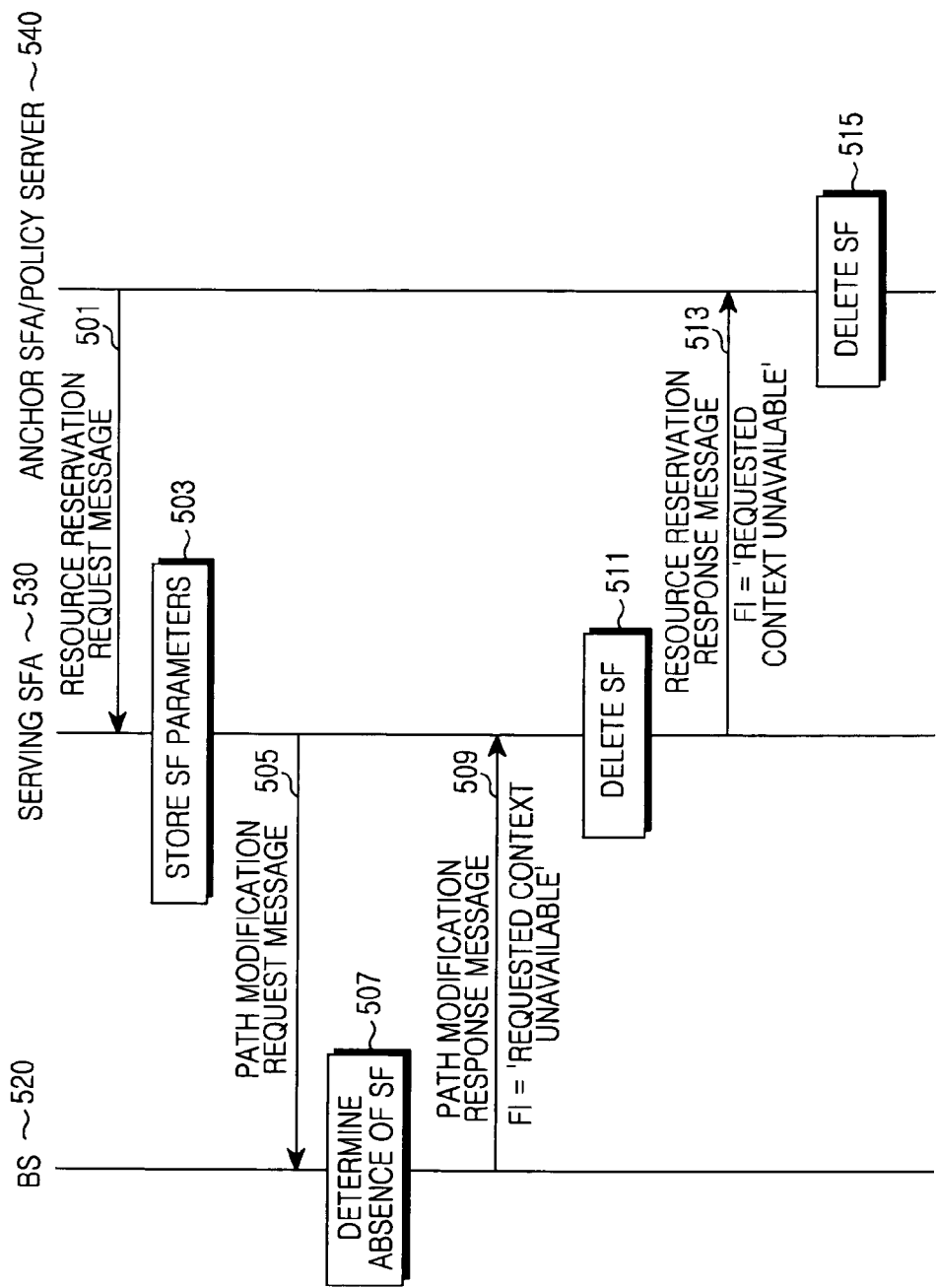

FIG. 5 shows the signal exchanges when the BS 520 has no SF in the network initiated SF parameter modification. The anchor SFA/policy server 540 sends the RR_REQ message in step 501, and the serving SFA 530 stores the SF parameters of the RR_REQ message in step 503. The serving SFA 530 sends the Path_Modification_REQ message in step 505, and the BS 520 determines the absence of the SF indicated by the Path_Modification_REQ message in step 507. Thus, the BS 520 sends the Path_Modification_RSP message including the FI 'Requested Context Unavailable' in step 509 and the serving SFA 530 deletes the SF in step 511. The serving SFA 530 sends the RR_RSP message including the FI 'Requested Context Unavailable' in step 513 and the anchor SFA/policy server 540 deletes the SF in step 515.

Figure 6:
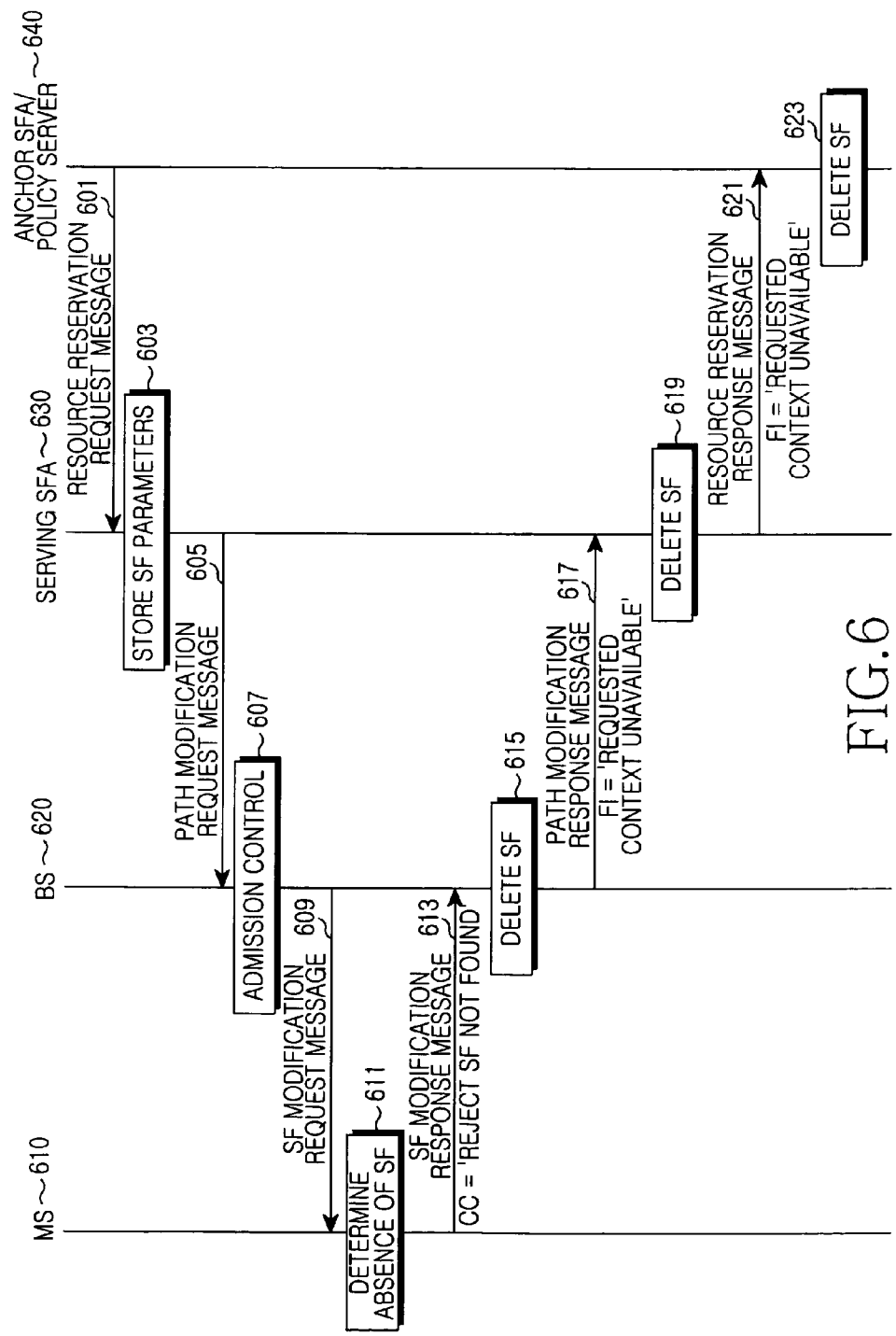

FIG. 6 shows the signal exchanges when the MS 610 includes no SF in the network initiated SF parameter modification. The anchor SFA/policy server 640 sends the RR_REQ message in step 601, and the serving SFA 630 stores the SF parameters of the RR_REQ message in step 603. The serving SFA 630 sends the Path_Modification_REQ message in step 605, and the BS 620 conducts the admission control in step 607. The BS 620 sends the SF modification request message in step 609, and the MS 610 determines the absence of the SF indicated by the SF modification request message in step 611. Therefore, the MS 610 sends the SF modification response message including the CC 'Reject SF not found' in step 613, and the BS 620 deletes the SF in step 615. Next, the BS 620 sends the Path_Modification_RSP message including the FI 'Requested Context Unavailable' in step 617 and the serving SFA 630 deletes the SF in step 619. The serving SFA 630 sends the RR_RSP message including the FI 'Requested Context Unavailable' in step 621 and the anchor SFA/policy server 640 deletes the SF in step 623.

Figure 7:
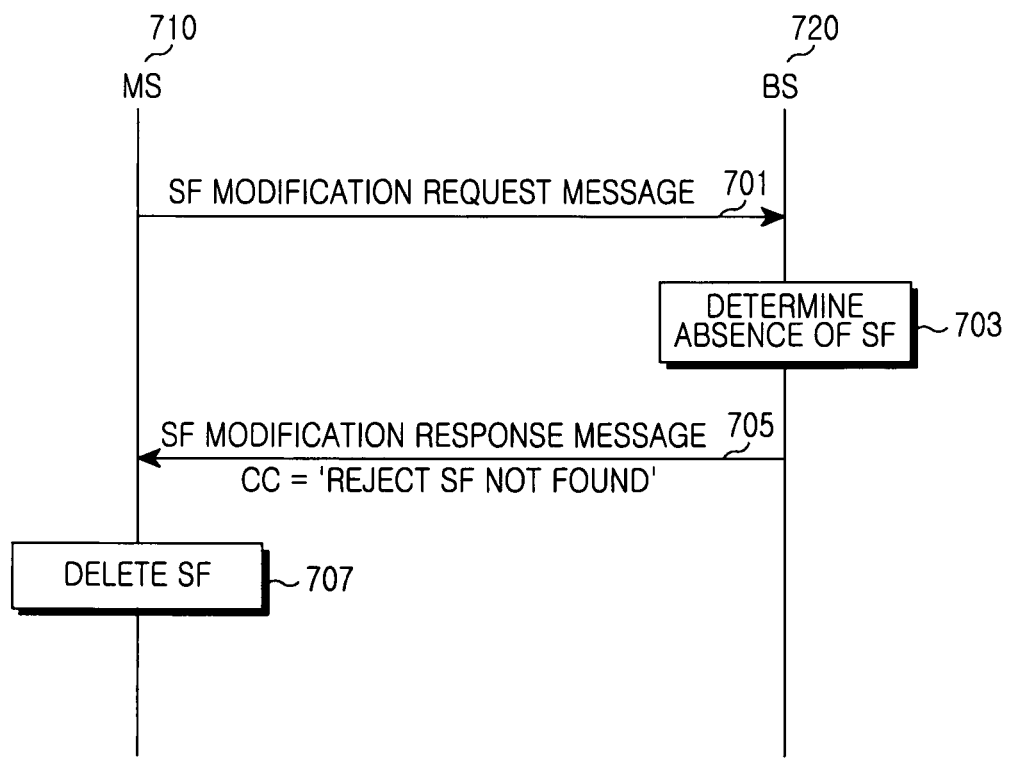

FIG. 7 shows the signal exchanges when the BS 720 includes no SF in the MS 710 initiated SF parameter modification. The MS 710 sends the SF modification request message in step 701 and the BS 720 determines the absence of the SF indicated by the SF modification request message in step 703. Therefore, the BS 720 sends the SF modification response message including the CC 'Reject SF not found' in step 705 and the MS 710 deletes the SF in step 707.

Figure 8:
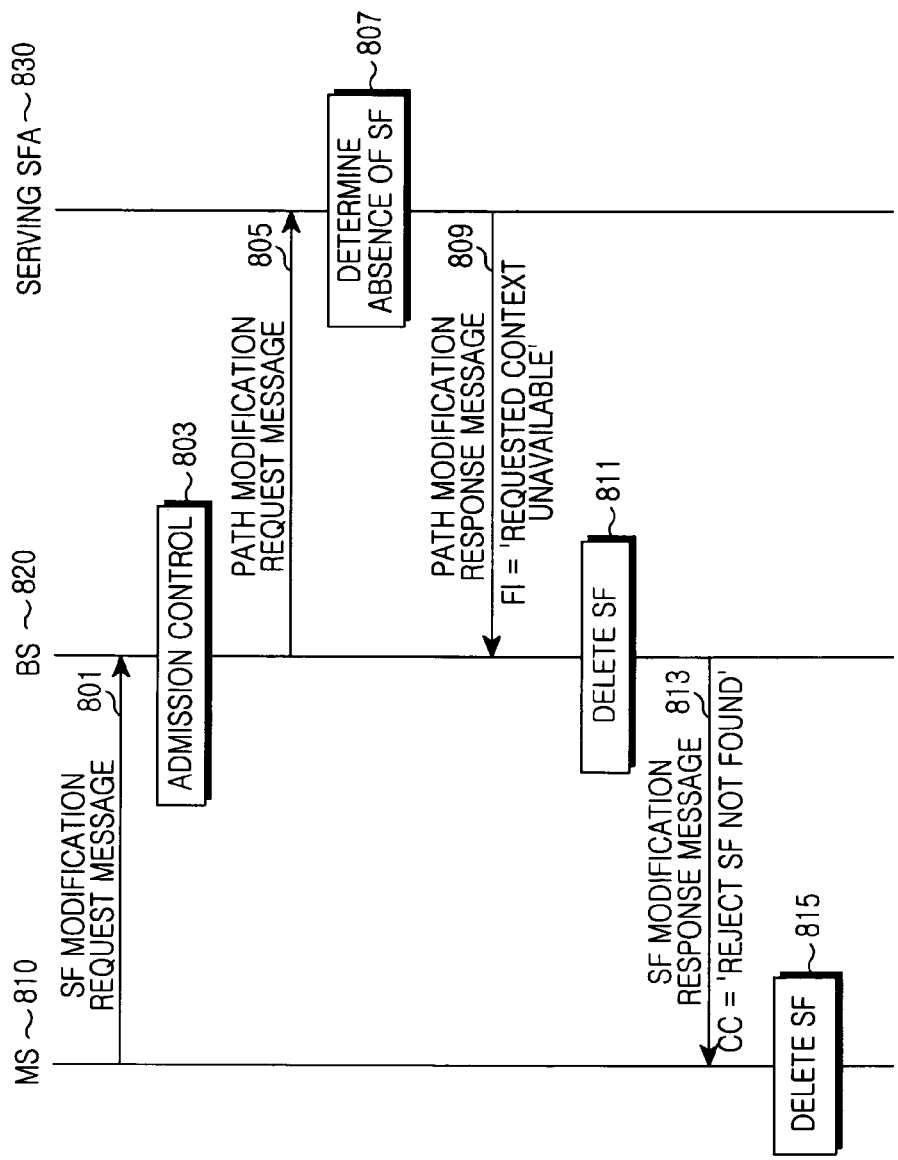

FIG. 8 shows the signal exchanges when the serving SFA 830 includes no SF in the MS 810 initiated SF parameter modification. The MS 810 sends the SF modification request message in step 801 and the BS 820 performs the admission control based on the SF parameters of the SF modification request message in step 803. Next, the BS 820 sends the Path_Modification_REQ message in step 805 and the serving SFA 830 determines the absence of the SF indicated by the SF Path_Modification_REQ message in step 807. Therefore, the serving SFA 830 sends the Path_Modification_RSP message including the FI 'Requested Context Unavailable' in step 809 and the BS deletes the SF in step 811. The BS 820 sends the SF modification response message including the CC 'Reject SF not found' in step 813 and the MS 810 deletes the SF in step 815.

Figure 9:
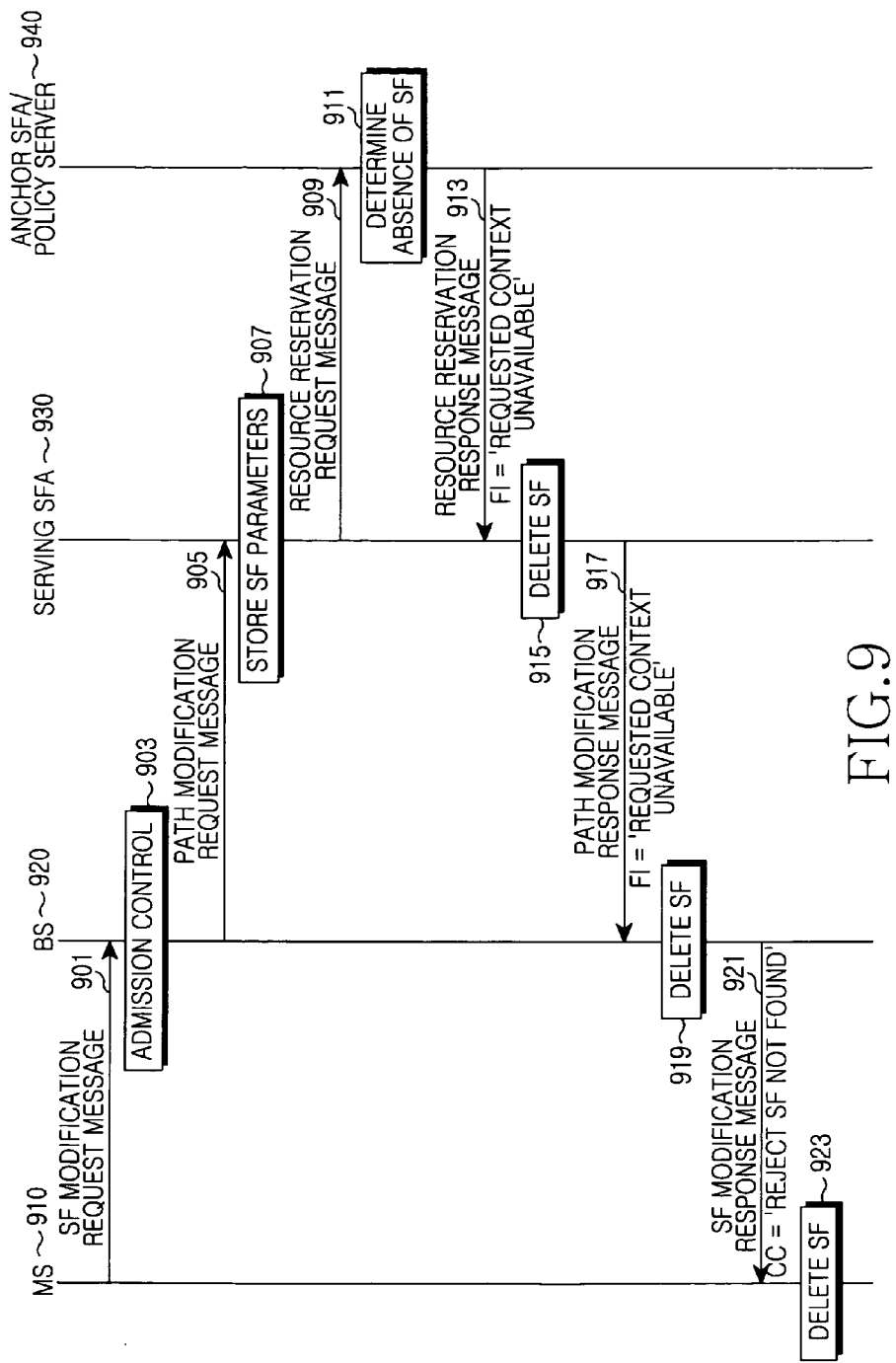

FIG. 9 shows the signal exchanges when the anchor SFA/policy server 930 includes no SF in the MS 910 initiated SF parameter modification. The MS 910 sends the SF modification request message in step 901 and the BS 920 performs the admission control based on the SF parameters of the SF modification request message in step 903. Thereafter, the BS 920 sends the Path_Modification_REQ message in step 905 and the serving SFA 930 stores the SF parameters of the Path_Modification_REQ message in step 907. Thereafter, the serving SFA 930 sends the RR_REQ message in step 909. The anchor SFA/policy server 940 determines the absence of the SF indicated by the RR_REQ message in step 911. Therefore, the anchor SFA/policy server 940 sends the RR_RSP message including the FI 'Requested Context Unavailable' in step 913. The serving SFA 930 deletes the SF in step 915. Thereafter, the serving SFA 930 sends the Path_Modification_RSP message including the FI 'Requested Context Unavailable' in step 917 and the BS 920 deletes the SF in step 919. The BS 920 sends the SF modification response message including the CC 'Reject SF not found' in step 921 and the MS 910 deletes the SF in step 923.

Besides the absence of the SF, the SF parameter modification process can fail on account of various reasons such as failure of the admission control of the BS or system error. When the SF parameter modification process fails, the corresponding NE sustains the SF parameters prior to the SF parameter modification request. More specifically, every NE receiving the message relating to the SF parameter modification restores the SF parameters prior to the SF parameter modification request and sends the response to the NE that requested the SF parameter modification. When the previous SF parameters can be recovered, the irrecoverableness needs to be notified to the policy server or the MS. To minimize the risk of the inconsistence, the corresponding SF is deleted.

When it is infeasible to notify the irrecoverableness of the previous SF parameters, the corresponding NE deletes every SF and every path to the MS and the policy server. For example, when the SF parameters are irrecoverable because of the error of the BS and the irrecoverableness of the SF parameters cannot be notified, the BS requests a Dynamic Service Delete (DSD) process to the MS to delete the SF and concurrently requests the path de-registration to the policy server. The SF recovery and the system error are explained in more detail.

Figure 10:
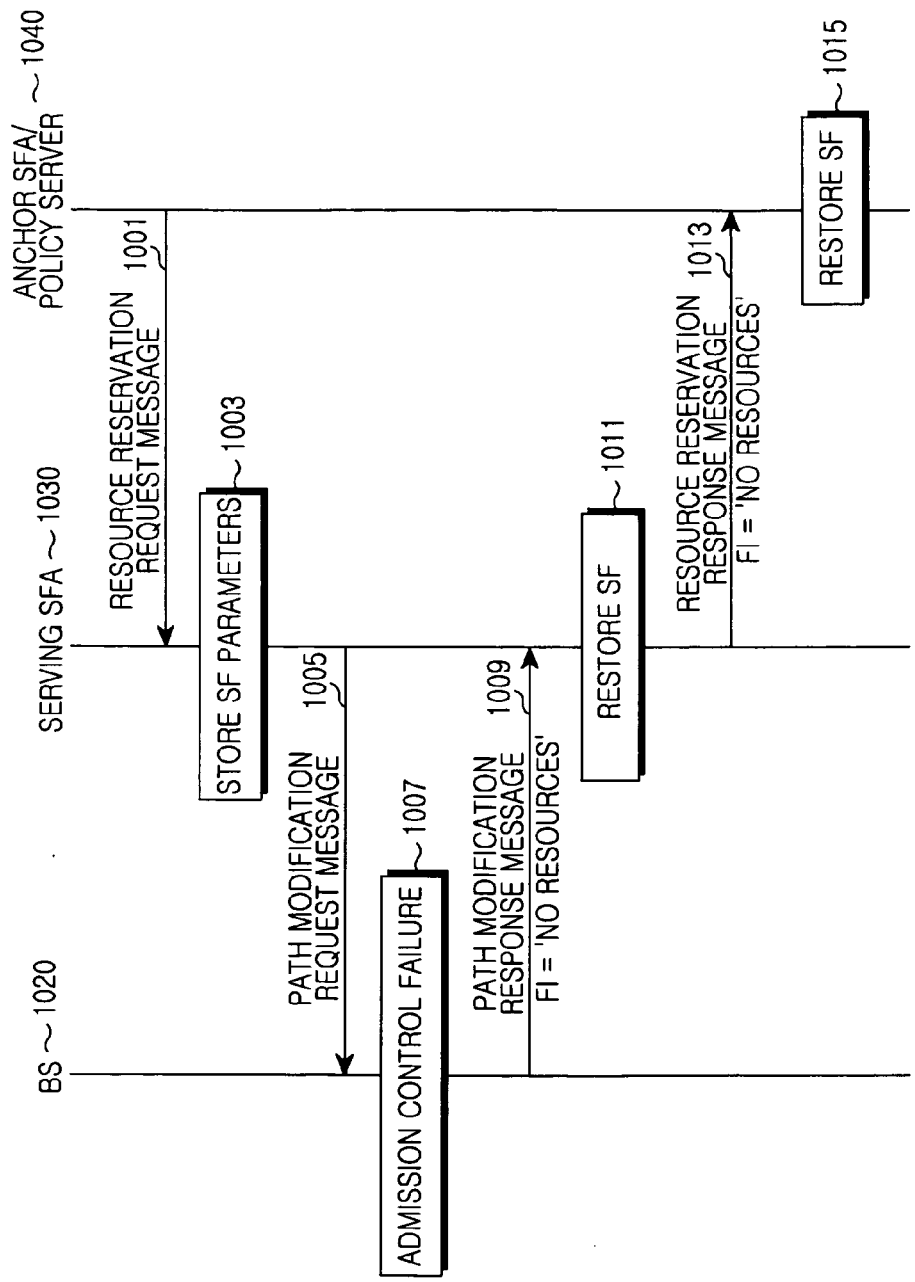
FIGS. 10 and 11 illustrate signal exchanges when the SF is restored in the SF parameter modification of the broadband wireless communication network according to an exemplary embodiment of the present invention.
Figure 11:
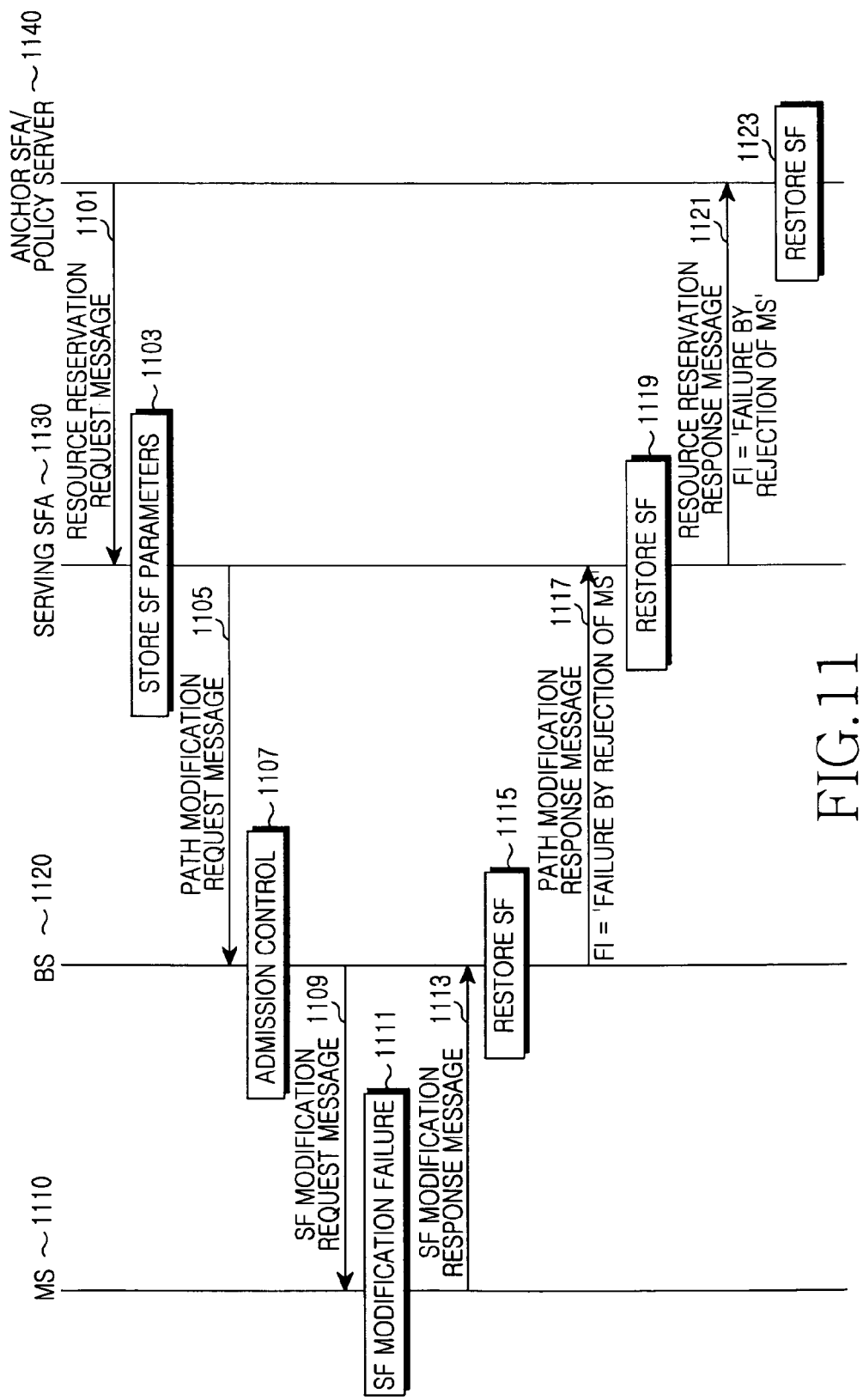

FIGS. 10 and 11 illustrate signal exchanges when the SF is restored in the SF parameter modification of the broadband wireless communication network according to an exemplary embodiment of the present invention.

FIG. 10 shows the signal exchanges when the admission control of the BS 1020 fails in the network initiated SF parameter modification. The anchor SFA/policy server 1040 sends the RR_REQ message in step 1001, and the serving SFA 1030 stores the SF parameters of the RR_REQ message in step 1003 and sends the Path_Modification_REQ message in step 1005. The BS 1020 performs the admission control and rejects the SF parameter modification; that is, fails in the admission control according to the result of the admission control in step 1007. Therefore, the BS 1020 sends the Path_Modification_RSP message including the FI 'No Resource' in step 1009. The serving SFA 1030 recovers the SF to the former state of the SF parameter modification request in step 1011. The serving SFA 1030 sends the RR_RSP message including the FI 'No Resource' in step 1013, and the anchor SFA/policy server 1040 restores the SF to the former state of the SF parameter modification request in step 1015.

FIG. 11 shows the signal exchanges when the MS 1110 fails in the SF modification in the network initiated SF parameter modification. The anchor SFA/policy server 1140 sends the RR_REQ message in step 1101, and the serving SFA 1130 stores the SF parameters of the RR_REQ message in step 1103 and sends the Path_Modification_REQ message in step 1105. The BS 1120 performs the admission control in step 1107 and sends the SF modification request message in step 1109. The MS 1110 tries to modify the SF parameters according to the SF modification request message but fails in the SF modification in step 1111. Therefore, the MS 1110 sends the SF modification response message informing of the SF modification failure in step 1113. The BS 1120 restores the SF to the former state of the SF parameter modification in step 1115. The BS 1120 sends the Path_Modification_RSP message including the FI 'Failure by rejection of MS' in step 1117. The serving SFA 1130 recovers the SF to the former state of the SF parameter modification request in step 1119. Thereafter, the serving SFA 1120 sends the RR_RSP message including the FI 'Failure by rejection of MS' in step 1121, and the anchor SFA/policy server 1140 restores the SF to the former state of the SF parameter modification request in step 1123.

Figure 12:
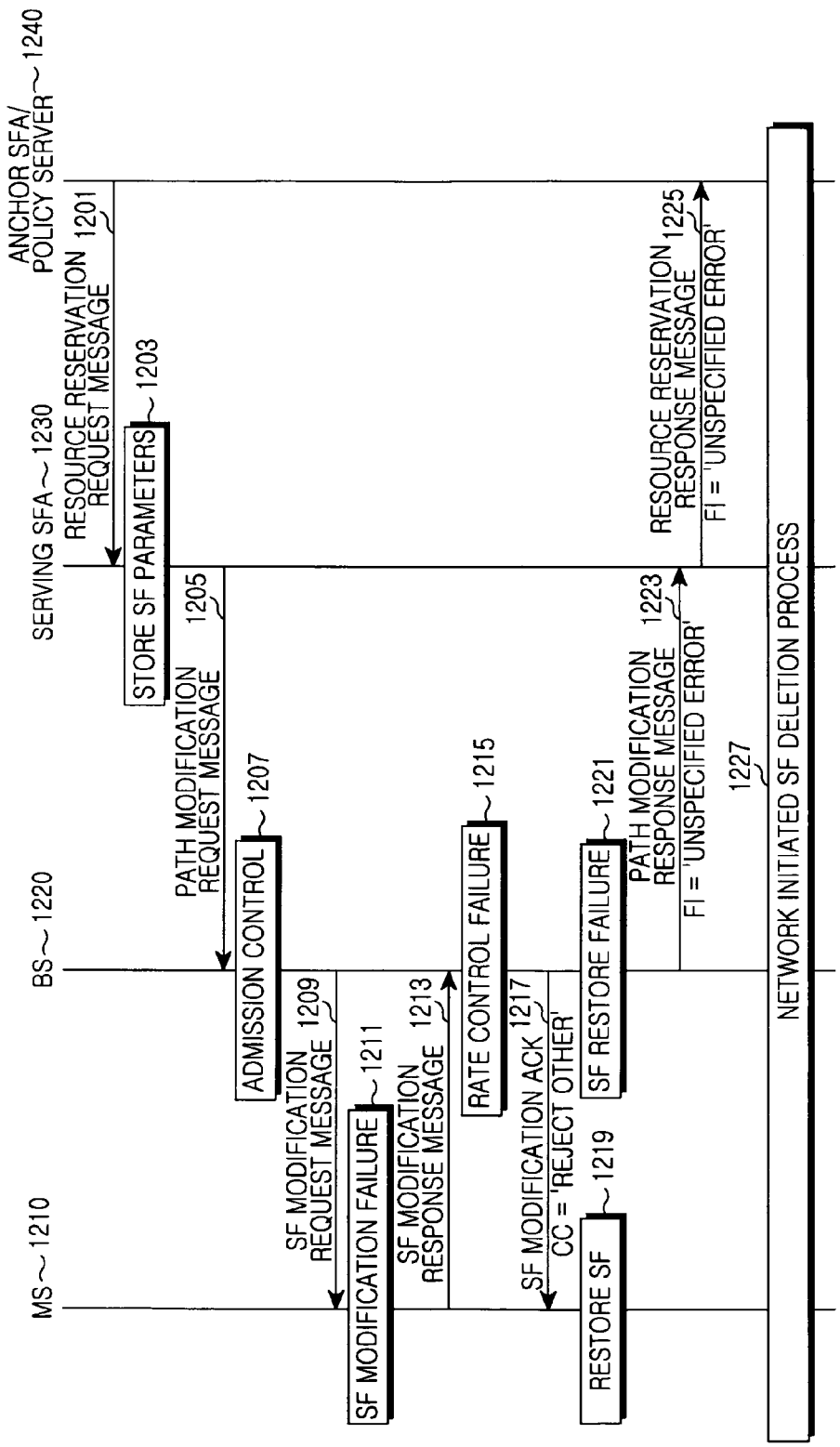
FIGS. 12 and 13 illustrate signal exchanges when the SF is deleted because of system error in the SF parameter modification of the broadband wireless communication network according to an exemplary embodiment of the present invention.
Figure 13:
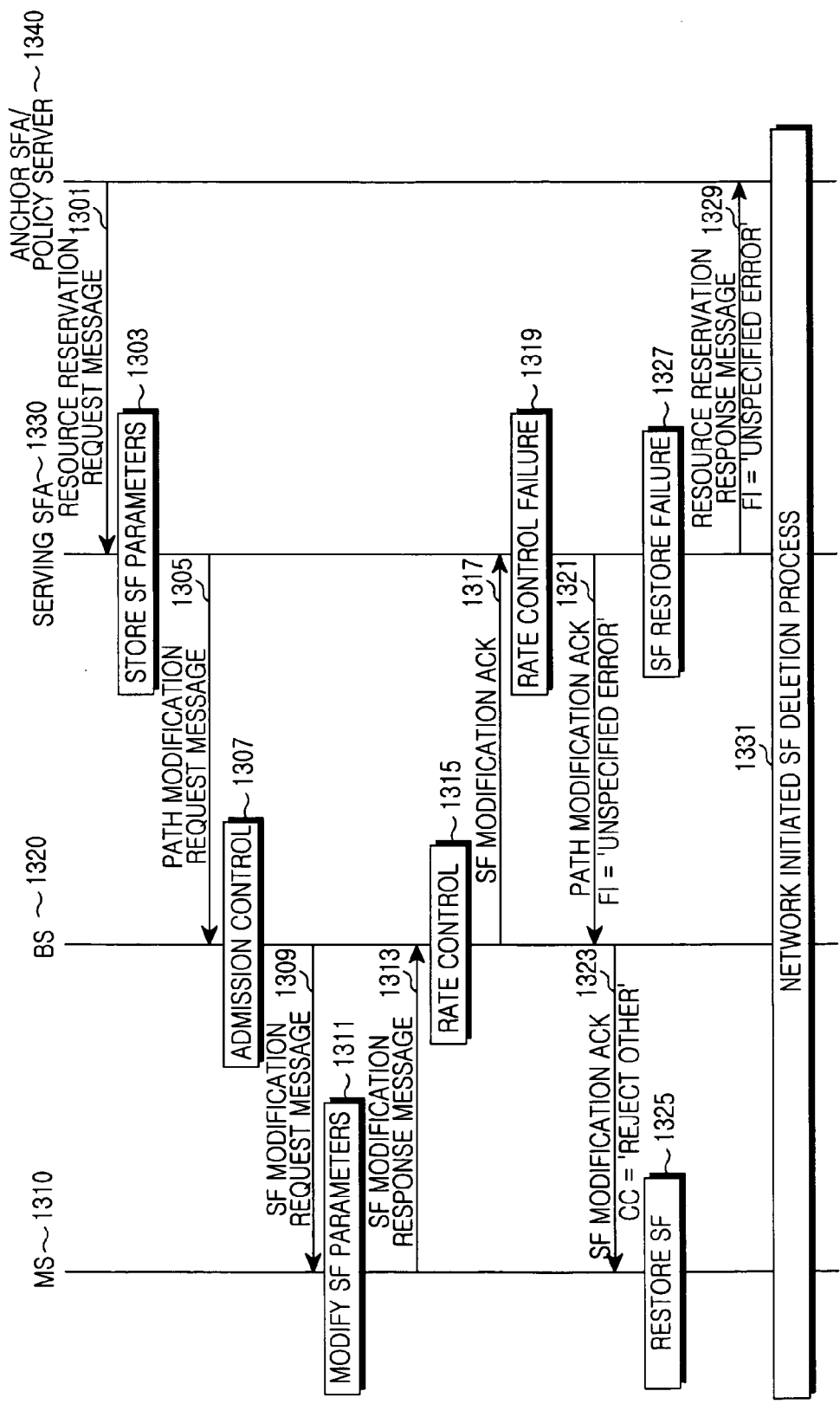

FIGS. 12 and 13 illustrate signal exchanges when the SF is deleted because of the system error in the SF parameter modification of the broadband wireless communication network according to an exemplary embodiment of the present invention.

FIG. 12 shows the signal exchanges when the BS 1220 experiences the system error in the network initiated SF parameter modification. The anchor SFA/policy server 1240 sends the RR_REQ message in step 1201, and the serving SFA 1230 stores the SF parameters of the RR_REQ message in step 1203 and sends the Path_Modification_REQ message in step 1205. The BS 1220 performs the admission control in step 1207 and sends the SF modification request message in step 1209. The MS 1210 modifies the SF parameters according to the SF modification request message in step 1211 and sends the SF modification response message in step 1213. The BS 1220 performs the rate control based on the new SF parameters but fails in the rate control in step 1215. Therefore, the BS 1220 sends the SF modification ACK including the CC 'Reject Other' in step 1217. The MS 1220 restores the SF to the former state of the SF parameter modification request in step 1219. At this time, the BS 1220 fails to restore the SF in step 1221. Accordingly, the BS 1220 sends the Path_Modification RSP message including the FI 'Unspecified Error' in step 1223, and the serving SFA 1230 sends the RR_RSP message including the FI 'Unspecified Error' in step 1225. Thereafter, the anchor SFA/policy server 1240 performs the network initiated SF deletion process in step 1227. Therefore, the network initiated SF deletion process is fulfilled such that the anchor/policy server sends a message for the SF deletion.

FIG. 13 illustrates the signal exchanges when the serving SFA 1330 experiences the system error in the network initiated SF parameter modification. The anchor SFA/policy server 1340 sends the RR_REQ message in step 1301, and the serving SFA 1330 stores the SF parameters of the RR_REQ message in step 1303 and sends the Path_Modification_REQ message in step 1305. The BS 1320 performs the admission control in step 1307 and sends the SF modification request message in step 1309. The MS 1310 modifies the SF parameters according to the SF modification request message in step 1311 and sends the SF modification response message in step 1313. The BS 1320 performs the rate control based on the new SF parameters in step 1315 and sends the Path_Modification_RSP message in step 1317. The serving SFA 1330 performs the rate control based on the new SF parameters but fails in the rate control in step 1319. Therefore, the serving SFA 1330 sends the Path_Modification_ACK including the FI 'Unspecified Error' in step 1321. The BS 1320 sends the SF modification ACK including the CC 'Reject Other' in step 1323 and the MS 1310 restores the SF to the former state of the SF parameter modification request in step 1325. In so doing, the serving SFA 1330 fails to restore the SF in step 1327. Accordingly, the serving SFA 1330 sends the RR_RSP message including the FI 'Unspecified Error' in step 1329. The anchor SFA/policy server 1340 performs the network initiated SF deletion process in step 1331.

When the timer expires, the NE recognizing the timer expiration cannot determine whether the SF parameters of every NE toward the unreceived message are the values before the SF parameter modification process or after the SF parameter modification process. That is, the NE recognizing the timer expiration cannot determine whether no response is received because its transmitted request is not arrived or because its request is arrived but only the response to itself is not received. Thus, in case of the timer expiration, the corresponding SF should be deleted. However, a particular NE may not recognize the error depending on the time point of the timer expiration. In this respect, the SF deletion process proceeds based on the type of the expired timer.

When the timer $T_7$ expires, that is, when the SF modification response (DSC-RSP) message is not received after the SF modification request (DSC-REQ) message is transmitted, the SF is deleted as follows. When the SF parameter modification process is initiated by the network, the BS 1320 recognizes the expiration of the timer $T_7$ and sends the Path_Modification_RSP message and the RR_RSP message including the FI 'timer expired' and the anchor SFA/policy server proceeds with the network initiated DSD process. In contrast, when the SF parameter modification process is initiated by the MS 1310, the MS 1310 recognizes the expiration of the timer $T_7$ and proceeds with the MS initiated DSD process. The SF deletion due to the $T_7$ timer expiration is explained in further detail.

Figure 14:
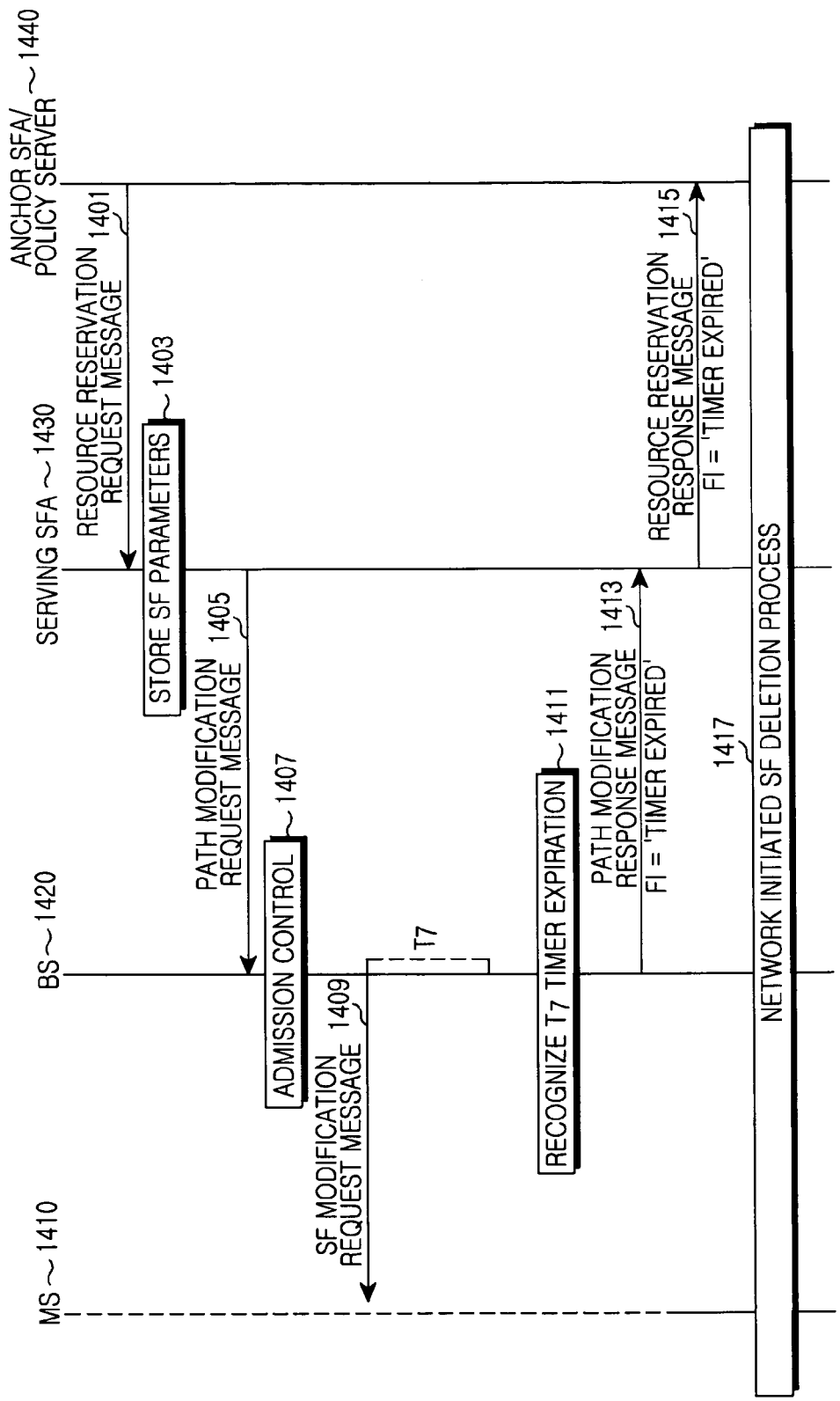
FIGS. 14 through 28 illustrate signal exchanges when the SF is deleted because a timer expires in the broadband wireless communication network according to an exemplary embodiment of the present invention.

FIG. 14 shows the signal exchanges when the timer $T_7$ expires in the network initiated SF parameter modification. The anchor SFA/policy server 1440 sends the RR_REQ message in step 1401, and the serving SFA 1430 stores the SF parameters of the RR_REQ message in step 1403 and sends the Path_Modification_REQ message in step 1405. The BS 1420 performs the admission control and sends the SF modification request message in step 1409. The BS 1420 starts the timer $T_7$ at the same time as sending the SF modification request message and recognizes the expiration of the timer $T_7$ without receiving the SF modification response message in step 1411. Thus, the BS 1420 sends the Path_Modification_RSP message including the FI 'timer expired' in step 1413. The serving SFA 1430 sends the RR_RSP message including the FI 'timer expired' in step 1415. Next, the anchor SFA/policy server 1440 performs the network initiated SF deletion process in step 1417.

Figure 15:
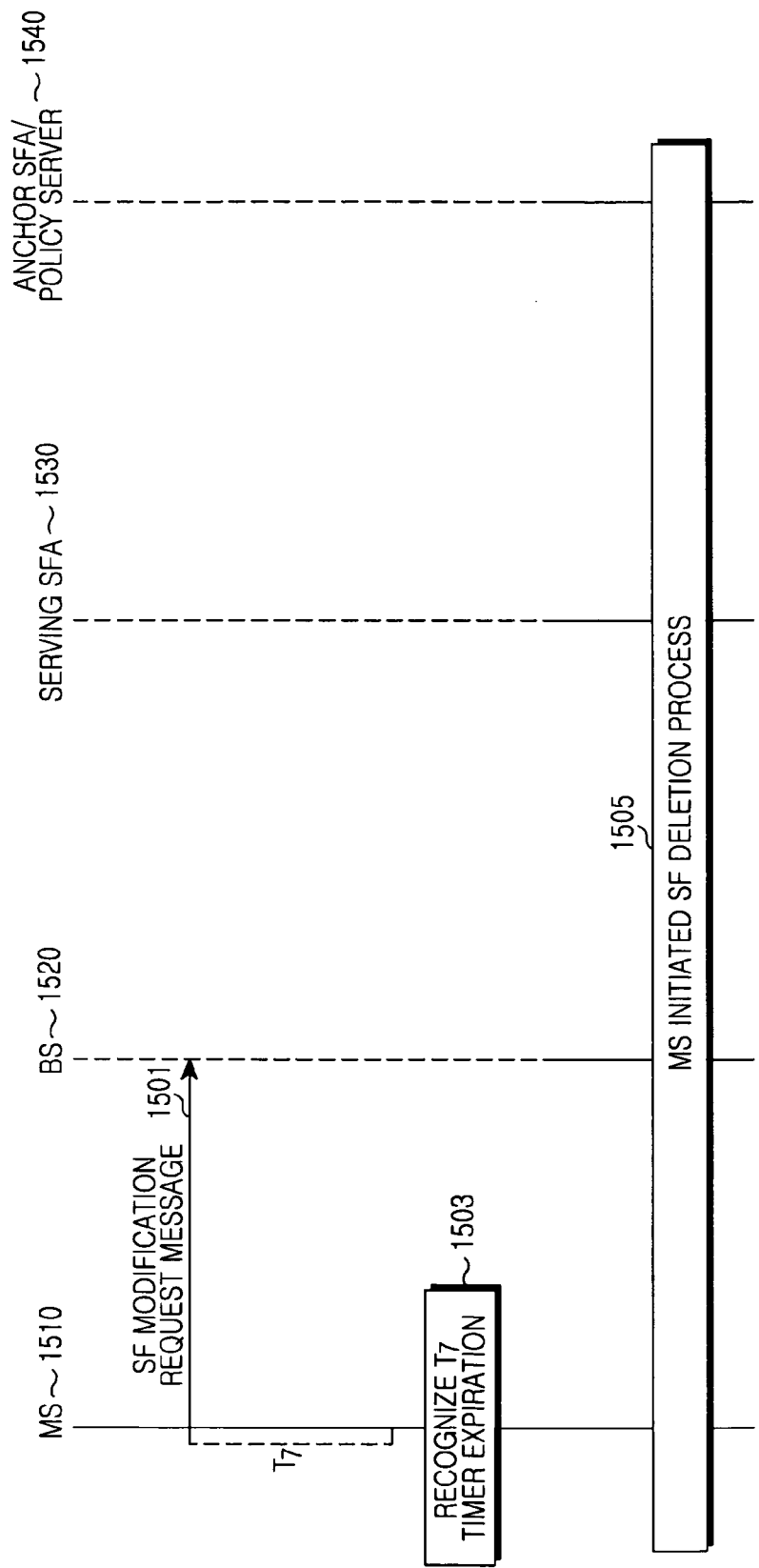

FIG. 15 shows the signal exchanges when the timer $T_7$ expires in the MS initiated SF parameter modification. The MS 1510 sends the SF modification request message in step 1501. The MS 1510 starts the timer $T_7$ at the same time as sending the SF modification request message and recognizes the expiration of the timer $T_7$ without receiving the SF modification response message in step 1503. Therefore, the MS 1510 performs the MS initiated SF deletion process in step 1505. Herein, the MS initiated SF deletion process is fulfilled such that the MS 1510 sends a message for the SF deletion. For example, the message for the SF deletion transmitted by the MS 1510 can be an SF deletion request (Dynamic Service Flow Delete REQuest (DSD-REQ)) message.

When the timer $T_8$ expires, that is, when the SF modification ACK (DSC-ACK) message is not received after the SF modification response (DSC-RSP) message is transmitted, the SF is deleted as follows. When the SF parameter modification process is initiated by the network, the MS 1510 recognizes the expiration of the timer $T_8$ and proceeds with the MS initiated DSD process. In contrast, when the SF parameter modification process is initiated by the MS 1510, the BS 1520 recognizes the expiration of the timer $T_8$ and sends the Path_Modification_ACK and the RR_ACK including the FI 'timer expired' and the anchor SFA/policy server 1540 proceeds with the network initiated DSD process. The SF deletion due to the $T_8$ timer expiration is explained in further detail.

Figure 16:
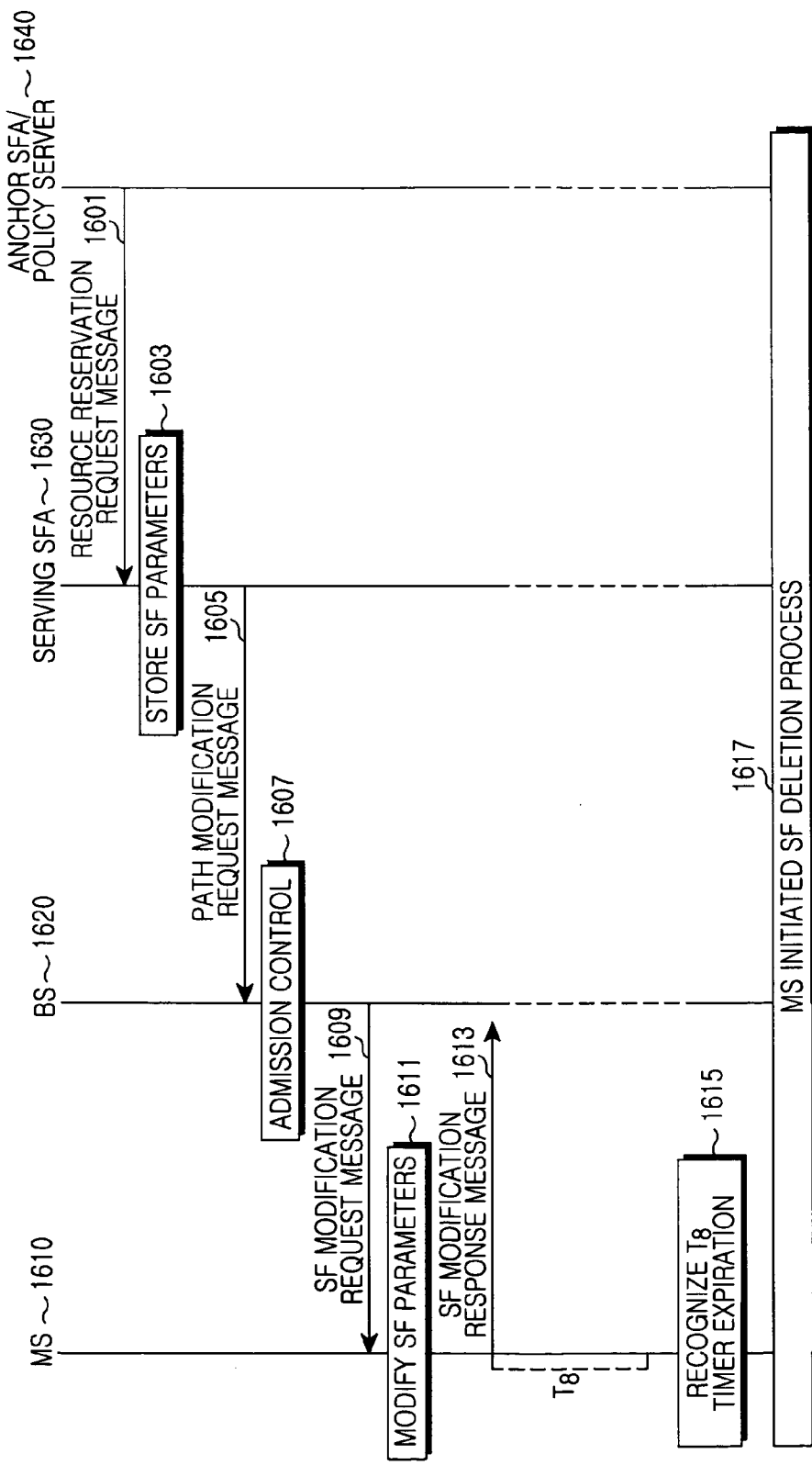

FIG. 16 shows the signal exchanges when the timer $T_8$ expires in the network initiated SF parameter modification. The anchor SFA/policy server 1640 sends the RR_REQ message in step 1601, and the serving SFA 1630 stores the SF parameters of the RR_REQ message in step 1603 and sends the Path_Modification_REQ message in step 1605. The BS 1620 performs the admission control in step 1607 and sends the SF modification request message in step 1609. The MS 1610 modifies the SF parameters according to the SF modification request message in step 1611 and sends the SF modification response message in step 1613. The MS 1610 starts the timer $T_8$ at the same time as sending the SF modification response message and recognizes the expiration of the timer $T_8$ without receiving the SF modification ACK in step 1615. Thus, the MS 1610 performs the MS initiated SF deletion process in step 1617.

Figure 17:
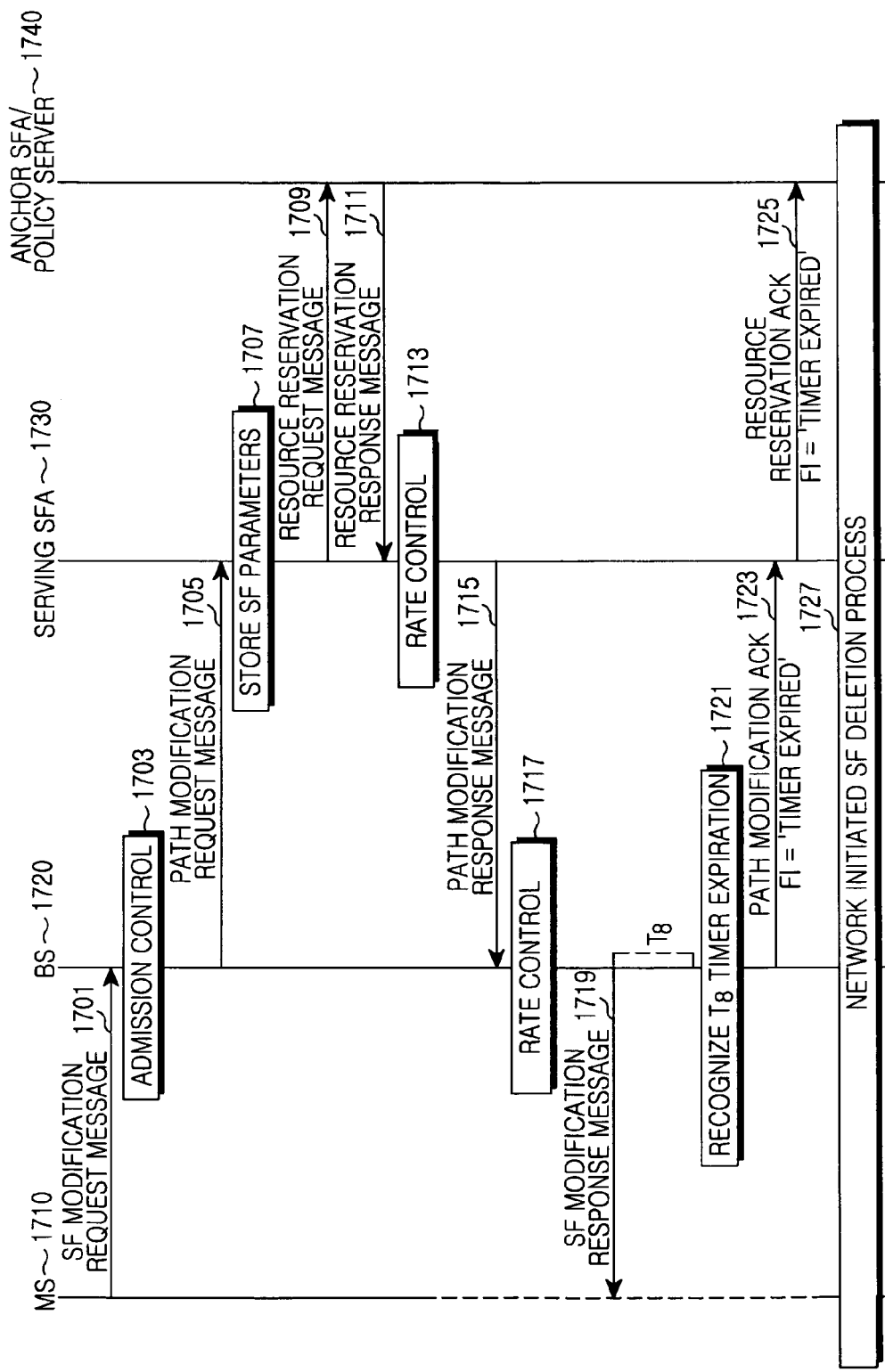

FIG. 17 shows the signal exchanges when the timer $T_8$ expires in the MS initiated SF parameter modification. The MS 1710 sends the SF modification request message in step 1701 and the BS 1720 performs the admission control based on the SF parameters of the SF modification request message in step 1703. Next, the BS 1720 sends the Path_Modification_REQ message in step 1705. The serving SFA 1730 stores the SF parameters of the Path_Modification_REQ message in step 1707 and sends the RR_REQ message in step 1709. The anchor SFA/policy server 1740 sends the RR_RSP message in step 1711. The serving SFA 1730 performs the rate control in step 1713 and sends the Path_Modification_RSP message in step 1715. Thereafter, the BS 1720 performs the rate control in step 1717 and sends the SF modification response message in step 1719. The BS 1720 starts the timer $T_8$ at the same time as sending the SF modification response message and recognizes the expiration of the timer $T_8$ without receiving the SF modification ACK in step 1721. Thus, the BS 1720 sends the Path_Modification_ACK including the FI 'timer expired' in step 1723, and the serving SFA 1730 sends the RR_ACK including the FI 'timer expired' in step 1725. Thereafter, the anchor SFA/policy server 1740 performs the network initiated SF deletion process in step 1727.

When $T_{path\_req}$ expires; that is, when no Path_Modification_RSP is received after the Path_Modification_REQ message is transmitted, the SF is deleted as follows. When the SF parameter modification process is initiated by the network, the serving SFA recognizes the expiration of $T_{path\_req}$. Therefore, the serving SFA 1730 sends the RR_RSP message including the FI 'timer expired' and the anchor SFA/policy server 1740 proceeds with the network initiated DSD process. In contrast, when the SF parameter modification process is initiated by the MS 1710, the BS 1720 recognizes the expiration of $T_{path\_req}$. Therefore, the BS 1720 sends the SF modification response (DSC-RSP) message including the CC 'reject other' or 'timer expired' and the MS 1710 proceeds with the MS initiated DSD process. Alternatively, when the SF parameter modification process is initiated by the MS 1710 in another exemplary embodiment, the BS 1720, which recognizes the expiration of $T_{path\_req}$, requests the DSD process and concurrently sends the Path_Deletion_REQ message to the serving SFA 1730. The SF deletion due to the $T_{path\_req}$ timer expiration is now elucidated.

Figure 18:
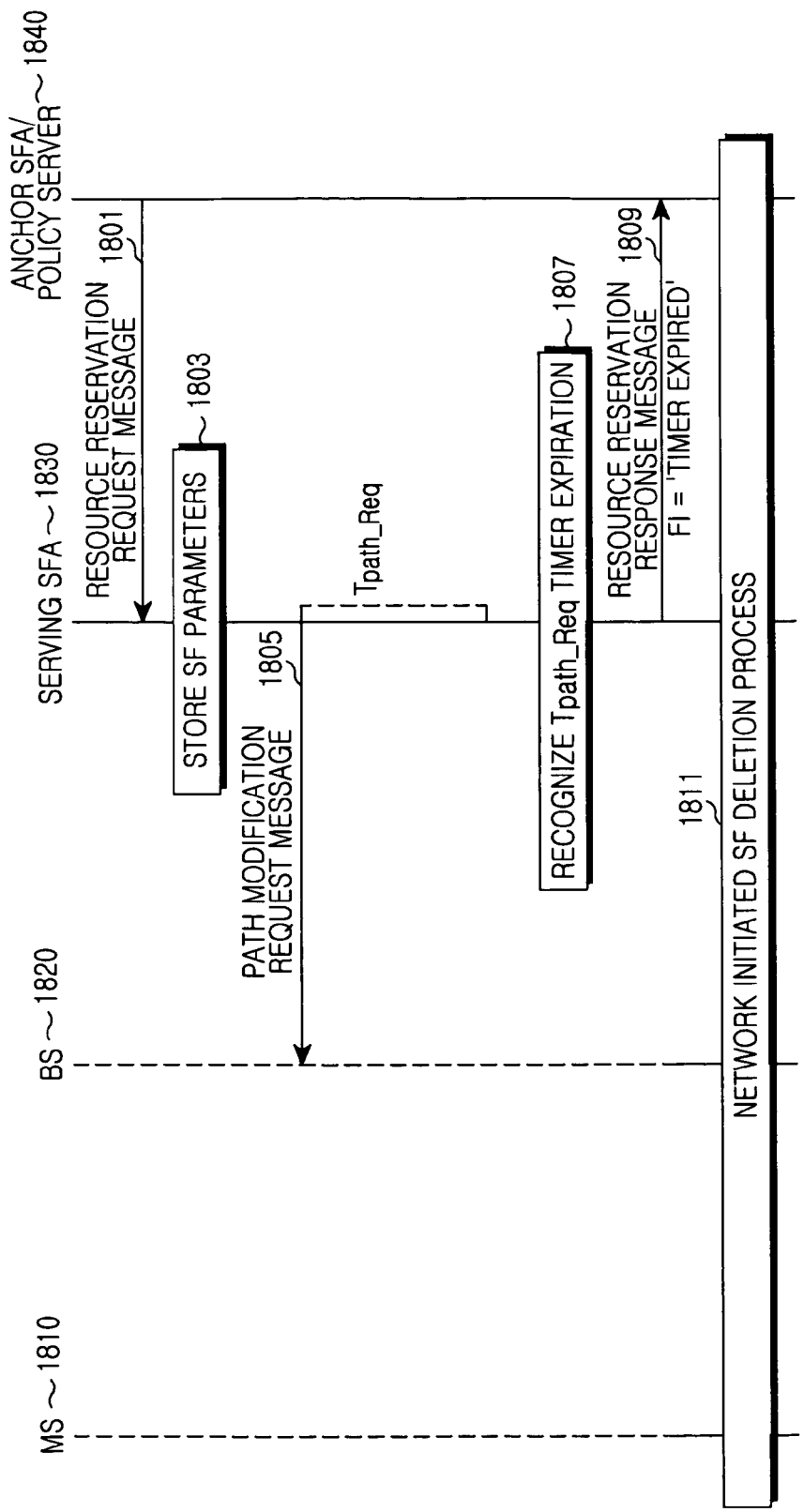

FIG. 18 shows the signal exchanges when the timer $T_{path\_req}$ expires in the network initiated SF parameter modification. The anchor SFA/policy server 1840 sends the RR_REQ message in step 1801. The serving SFA 1830 stores the SF parameters of the RR_REQ message in step 1803 and sends the Path_Modification_REQ message in step 1805. The serving SFA 1830 starts the timer $T_{path\_req}$ at the same time as sending the Path_Modification_REQ message, and recognizes the expiration of the timer $T_{path\_req}$ without receiving the Path_Modification_RSP message in step 1807. Accordingly, the serving SFA 1830 sends the RR_RSP message including the FI 'timer expired' in step 1809, and the anchor SFA/policy server 1840 proceeds with the network initiated SF deletion process in step 1811.

Figure 19:
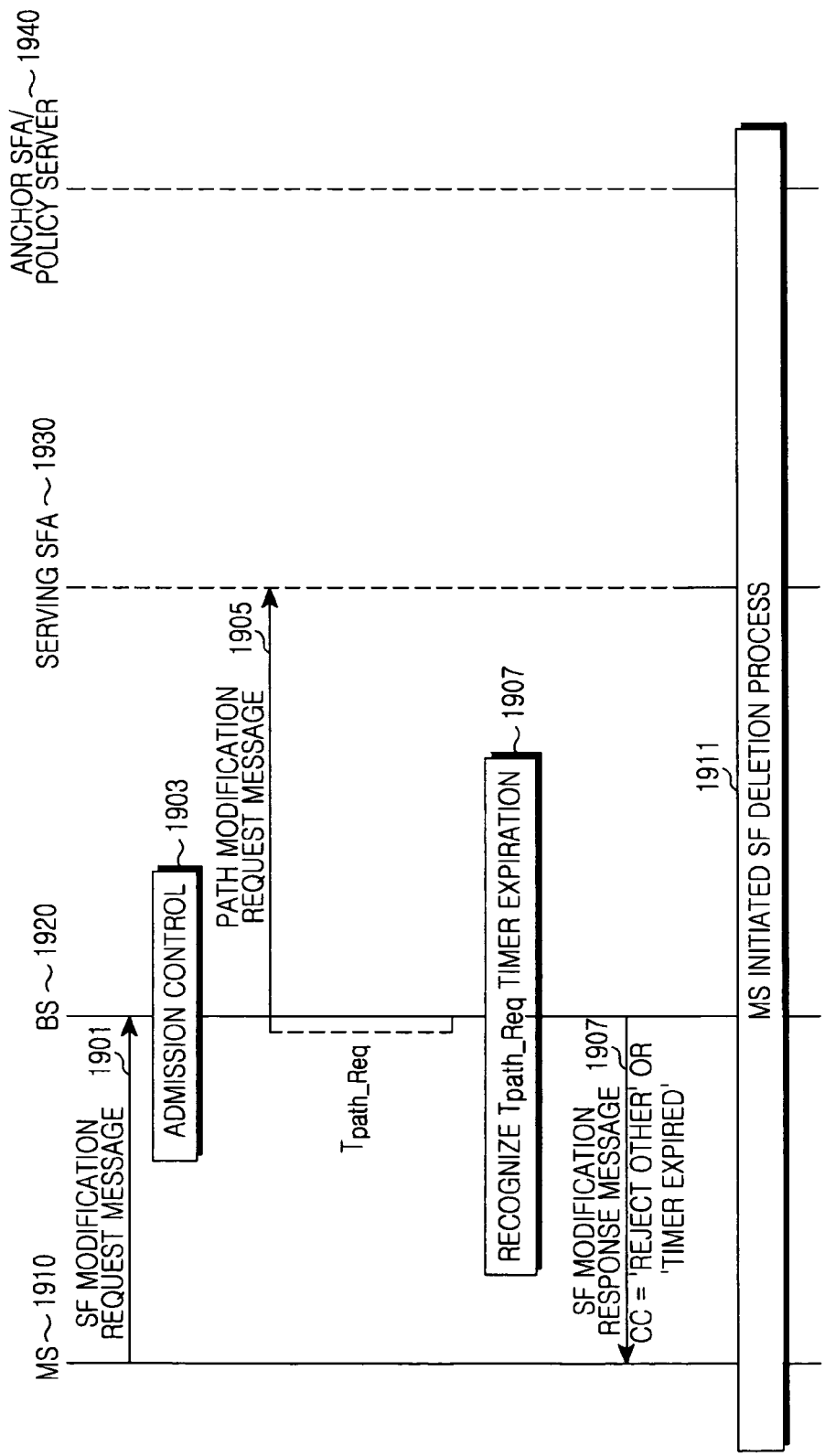

FIG. 19 shows the signal exchanges when the timer $T_{path\_req}$ expires in the MS initiated SF parameter modification. The MS 1910 sends the SF modification request message in step 1901. The BS 1920 performs the admission control based on the SF parameters of the SF modification request message in step 1903 and sends the Path_Modification_REQ message in step 1905. The BS 1920 starts the timer $T_{path\_req}$ at the same time as sending the Path_Modification_REQ message, and recognizes the expiration of the timer $T_{path\_req}$ without receiving the Path_Modification_RSP message in step 1907. Accordingly, the BS 1920 sends the SF modification response message including the CC 'reject other' or 'timer expired' in step 1909, and the MS 1910 proceeds with the MS initiated SF deletion process in step 1911.

Figure 20:
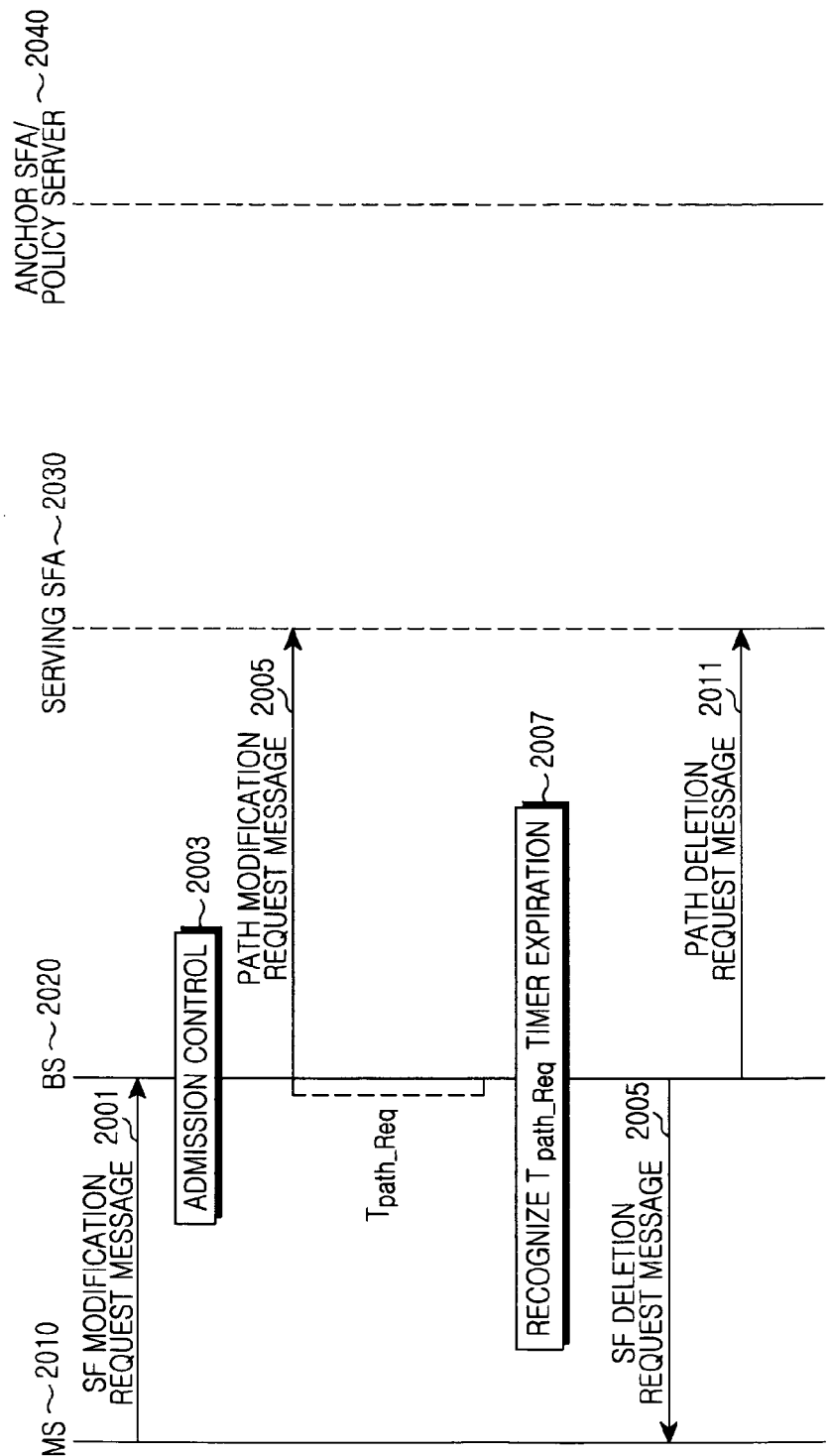

FIG. 20 shows the signal exchanges when the timer $T_{path\_req}$ expires in the MS initiated SF parameter modification. The MS 2010 sends the SF modification request message in step 2001. The BS 2020 performs the admission control based on the SF parameters of the SF modification request message in step 2003 and sends the Path_Modification_REQ message in step 2005. The BS 2020 starts the timer $T_{path\_req}$ at the same time as sending the Path_Modification_REQ message, and recognizes the expiration of the timer $T_{path\_req}$ without receiving the Path_Modification_RSP message in step 2007. Accordingly, the BS 2020 sends the SF deletion request message to the MS 2010 in step 2009 and sends the Path_Deletion_REQ message to the serving SFA in step 2011.

When $T_{path\_rsp}$ expires; that is, when no Path_Modification_ACK is received after the Path_Modification_RSP message is transmitted, the SF is deleted as follows. When the SF parameter modification process is initiated by the network, the BS 2020 recognizes the expiration of $T_{path\_rsp}$. Therefore, the BS 2020 sends the SF modification ACK (DSC-ACK) including the CC 'reject other' or 'timer expired' and the MS 2010 proceeds with the MS initiated DSD process. Alternatively, when the SF parameter modification process is initiated by the network in another exemplary embodiment, the BS 2020, which recognizes the expiration of $T_{path\_req}$, proceeds with the BS 2020 initiated DSD process and concurrently sends the Path_Deletion_REQ message to the serving SFA 2030. In contrast, when the SF parameter modification process is initiated by the MS 2010, the serving SFA 2030, which recognizes the expiration of $T_{path\_rsp}$, sends the RR_ACK message including the FI 'timer expired' and the anchor SFA/policy server 2040 proceeds with the network initiated DSD process. The SF deletion due to the $T_{path\_rsp}$ timer expiration is elucidated below.

Figure 21:
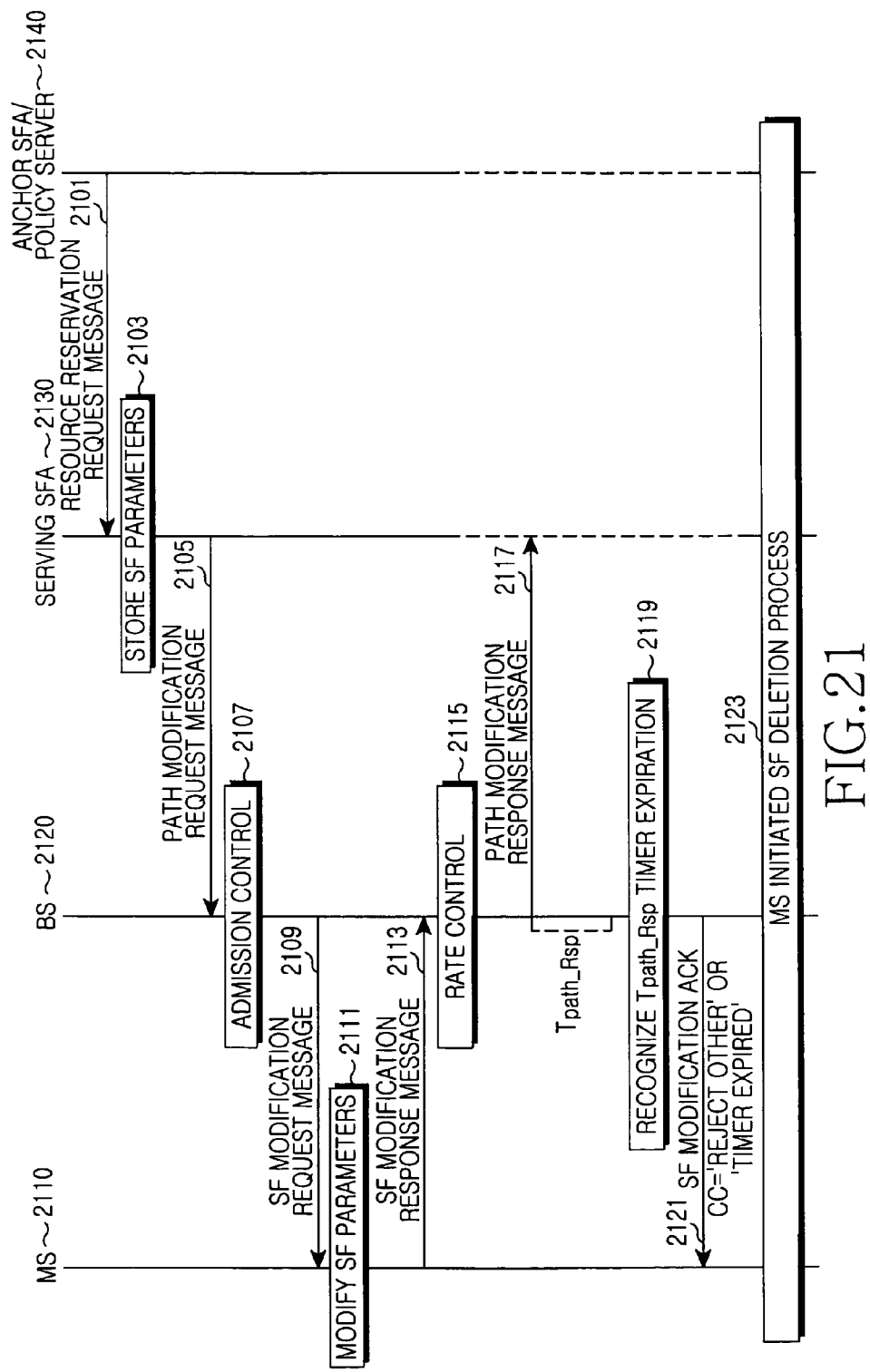

FIG. 21 shows the signal exchanges when the timer $T_{path\_rsp}$ is expired in the network initiated SF parameter modification. The anchor SFA/policy server 2140 sends the RR_REQ message in step 2101, and the serving SFA 2130 stores the SF parameters of the RR_REQ message in step 2103 and sends the Path_Modification_REQ message in step 2105. The BS 2120 performs the admission control in step 2107 and sends the SF modification request message in step 2109. The MS 2140 modifies the SF parameters according to the SF modification request message in step 2111 and sends the SF modification response message in step 2113. The BS 2120 performs the rate control based on the new SF parameters in step 2115 and sends the Path_Modification_RSP message in step 2117. The BS 2120 starts the timer $T_{path\_rsp}$ at the same time as sending the Path_Modification_RSP message, and recognizes the expiration of the timer $T_{path\_rsp}$ without receiving the Path_Modification_ACK in step 2119. Therefore, the BS 2120 sends the SF modification ACK including the CC 'reject other' or 'timer expired' in step 2121. The MS 2110 proceeds with the MS initiated SF deletion process in step 2123.

Figure 22:
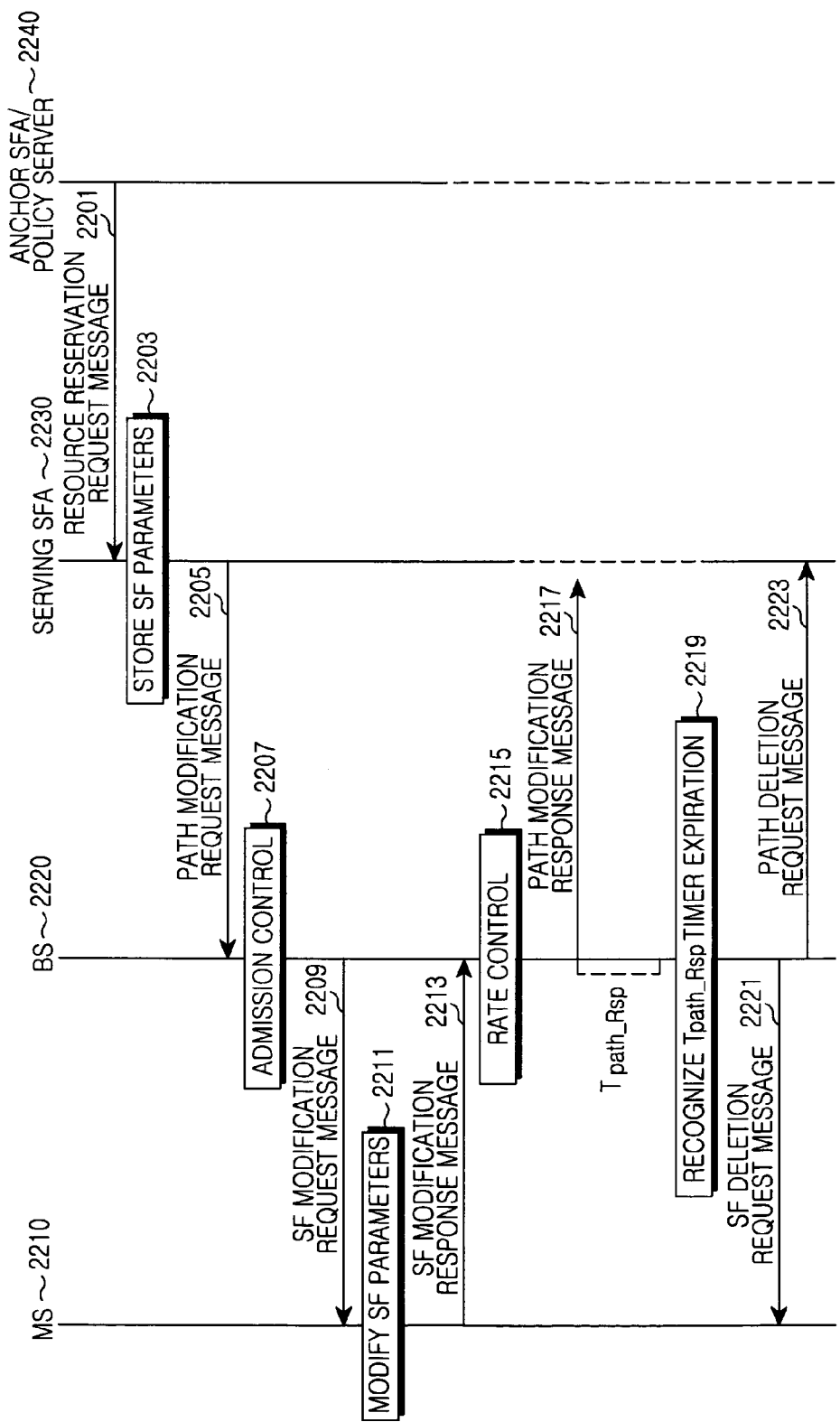

FIG. 22 shows the signal exchanges when the timer of $T_{path\_rsp}$ is expired in the network initiated SF parameter modification. The anchor SFA/policy server 2240 sends the RR_REQ message in step 2201, and the serving SFA 2230 stores the SF parameters of the RR_REQ message in step 2203 and sends the Path_Modification_REQ message in step 2205. The BS 2220 performs the admission control in step 2207 and sends the SF modification request message in step 2209. The MS 2210 modifies the SF parameters according to the SF modification request message in step 2211 and sends the SF modification response message in step 2213. The BS 2220 performs the rate control based on the new SF parameters in step 2215 and sends the Path_Modification_RSP message in step 2217. The BS 2220 starts the timer $T_{path\_rsp}$ at the same time as sending the Path_Modification_RSP message, and recognizes the expiration of the timer $T_{path\_rsp}$ without receiving the Path_Modification_ACK in step 2219. Therefore, the BS 2220 sends the SF deletion request message to the MS 2210 in step 2221 and sends the Path_Deletion_REQ message to the serving SFA in step 2223.

Figure 23:
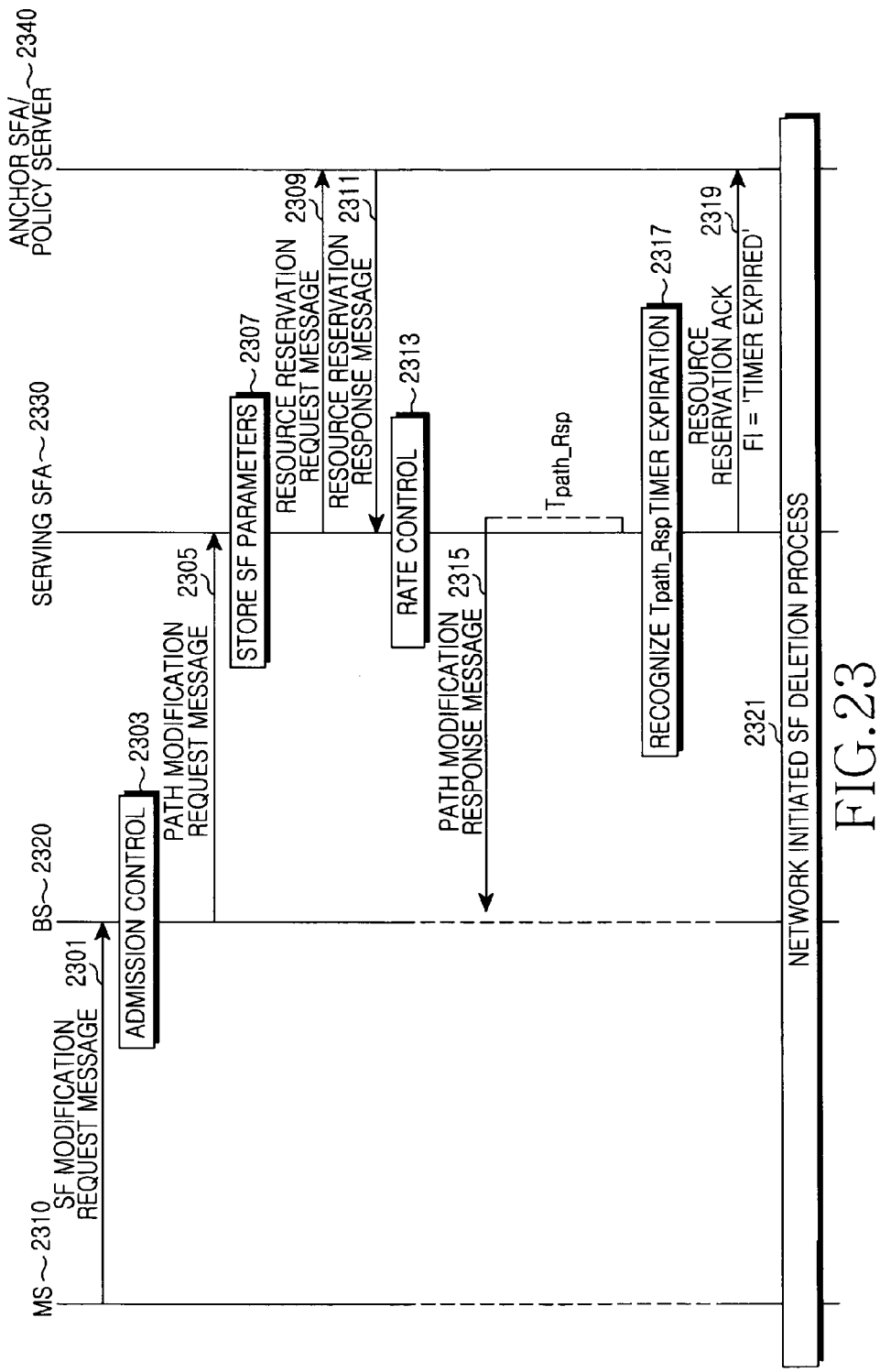

FIG. 23 shows the signal exchanges when the timer $T_{path\_rsp}$ expires in the MS initiated SF parameter modification. The MS 2310 sends the SF modification request message in step 2301 and the BS 2320 performs the admission control based on the SF parameters of the SF modification request message in step 2303. Thereafter, the BS 2320 sends the Path_Modification_REQ message in step 2305. The serving SFA 2330 stores the SF parameters of the Path_Modification_REQ message in step 2307 and sends the RR_REQ message in step 2309. The anchor SFA/policy server 2340 sends the RR_RSP message in step 2311. The serving SFA 2330 performs the rate control in step 2313 and sends the Path_Modification_RSP message in step 2315. The serving SFA 2330 starts the timer $T_{path\_rsp}$ at the same time as sending the Path_Modification_RSP message and recognizes the expiration of the timer $T_{path\_rsp}$ without receiving the Path_Modification_ACK in step 2317. Therefore, the serving SFA 2330 sends the RR_ACK including the FI 'timer expired' in step 2319. The anchor SFA/policy server 2340 proceeds with the network initiated SF deletion process in step 2321.

When $T_{rr\_req}$ expires; that is, when no RR_RSP message is received after the RR_REQ message is transmitted, the SF is deleted as follows. When the SF parameter modification process is initiated by the network, the anchor SFA/policy server 2340 recognizes the expiration of $T_{rr\_req}$ and thus makes the corresponding MS 2310 exit the network. In contrast, when the SF parameter modification process is initiated by the MS 2310, the serving SFA 2330 recognizes the expiration of $T_{rr\_req}$ and thus sends the Path_Modification_RSP message including the FI 'timer expired'. The BS 2320 sends the SF modification response (DSC-RSP) message including the CC 'reject other' or 'timer expired', or requests the DSD process and simultaneously sends the Path_Deletion_REQ message to the serving SFA 2330. The SF deletion as a result of the $T_{rr\_req}$ timer expiration is provided in detail.

Figure 24:
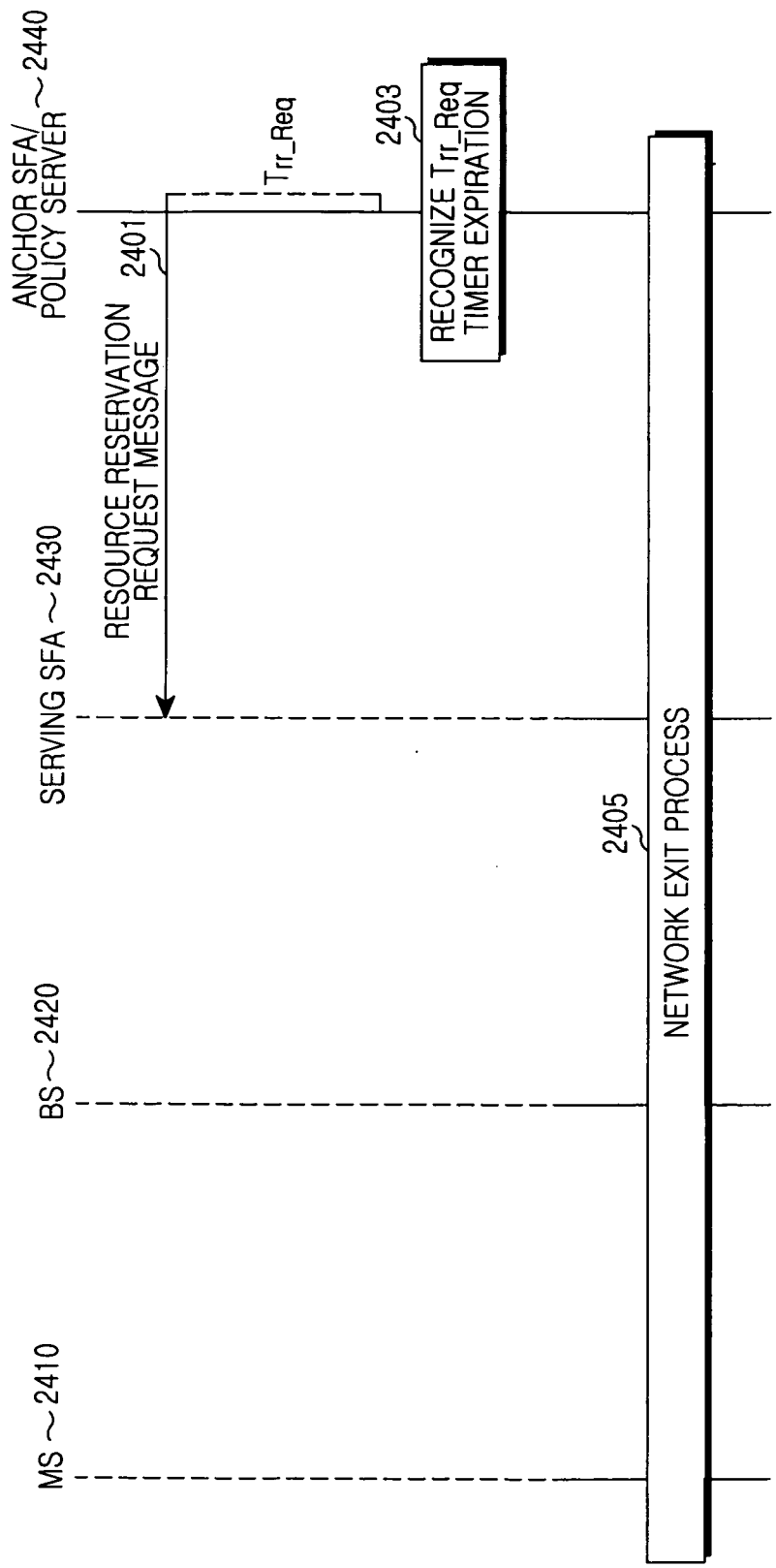

FIG. 24 shows the signal exchanges when the timer $T_{rr\_req}$ expires in the network initiated SF parameter modification. The anchor SFA/policy server 2440 sends the RR_REQ message in step 2401. The anchor SFA/policy server 2440 starts the timer $T_{rr\_req}$ at the same time as sending the RR_REQ message, and recognizes the expiration of the timer $T_{rr\_req}$ without receiving the RR_RSP message in step 2403. Therefore, the anchor SFA/policy server 2440 carries out the network exit process in step 2405.

Figure 25:
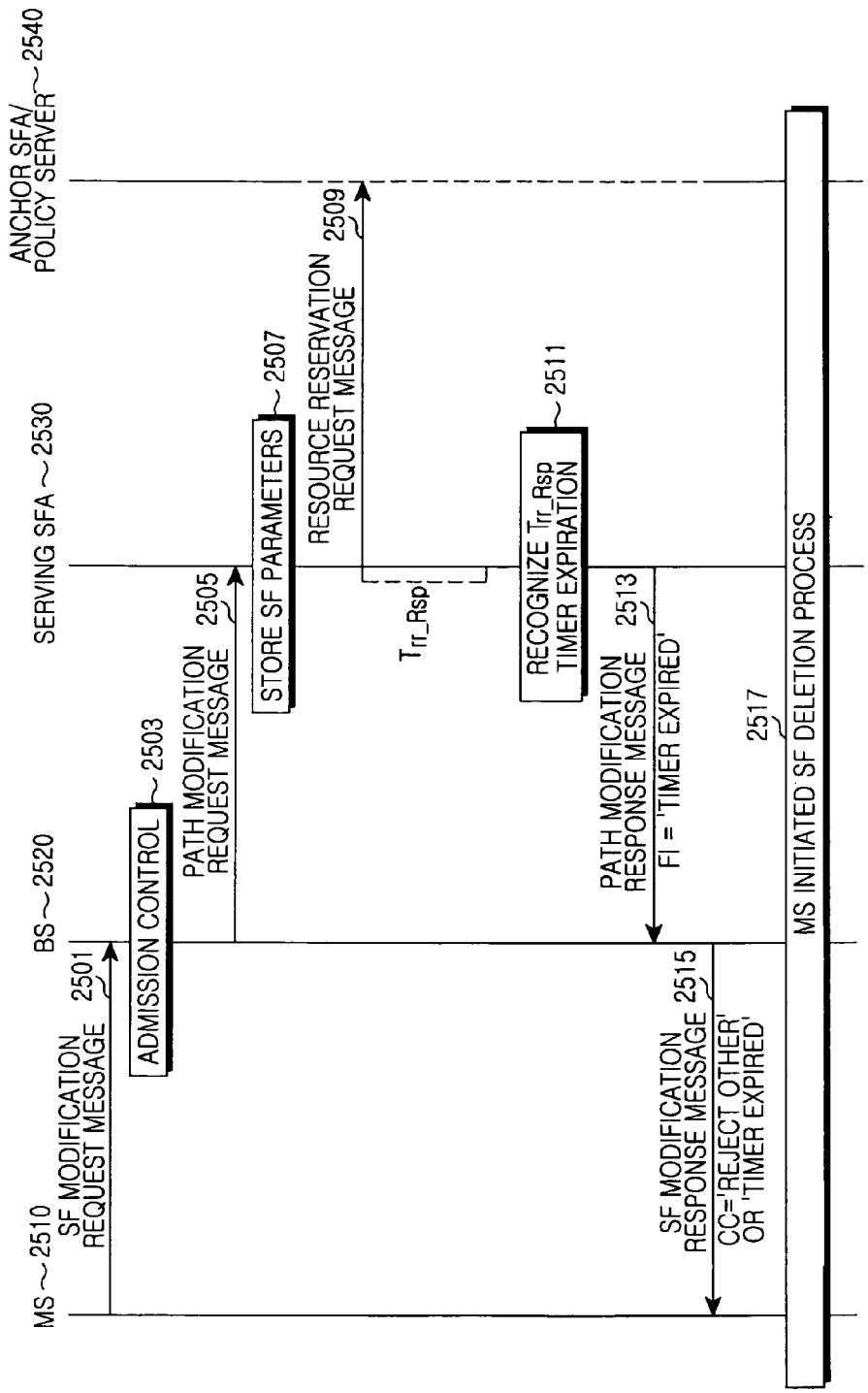

FIG. 25 shows the signal exchanges when the timer $T_{rr\_req}$ expires in the MS initiated SF parameter modification. The MS 2510 sends the SF modification request message in step 2501 and the BS 2520 performs the admission control based on the SF parameters of the SF modification request message in step 2503. Next, the BS 2520 sends the Path_Modification_REQ message in step 2505. The serving SFA 2530 stores the SF parameters of the Path_Modification_REQ message in step 2507 and sends the RR_REQ message in step 2509. The serving SFA 2530 starts the timer $T_{rr\_req}$ at the same time as sending the RR_REQ message and recognizes the expiration of the timer $T_{rr\_req}$ without receiving the RR_RSP message in step 2511. Therefore, the serving SFA 2530 sends the Path_Modification_RSP message including the FI 'timer expired' in step 2513. The BS 2520 sends the SF modification response message including the CC 'reject other' or 'timer expired' in step 2515 and the MS 2510 performs the MS initiated SF deletion process in step 2517.

Figure 26:
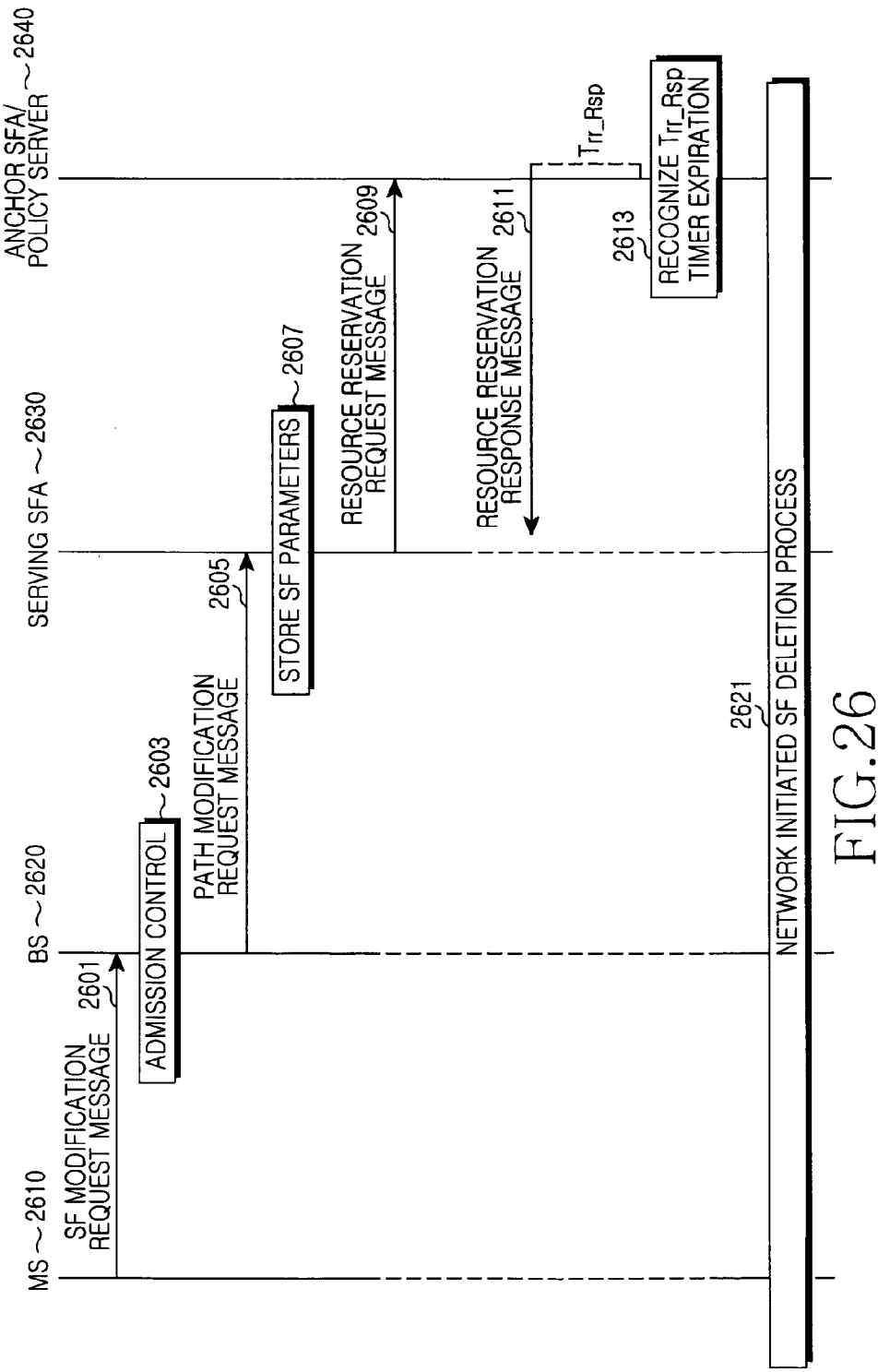

FIG. 26 shows the signal exchanges when the timer $T_{rr\_req}$ expires in the MS initiated SF parameter modification. The MS 2610 sends the SF modification request message in step 2601 and the BS 2620 performs the admission control based on the SF parameters of the SF modification request message in step 2603. Thereafter, the BS 2620 sends the Path_Modification_REQ message in step 2605. The serving SFA 2630 stores the SF parameters of the Path_Modification_REQ message in step 2607 and sends the RR_REQ message in step 2609. Then, the anchor SFA/policy server 2640 sends the RR_RSP message in step 2611. The anchor SFA/policy server 2640 starts the timer $T_{rr\_Rsp}$ at the same time as sending the RR_RSP message and recognizes the expiration of the timer $T_{rr\_Rsp}$ without receiving the RR_ACK in step 2613. Therefore, the anchor SFA/policy server 2640 performs the network initiated SF deletion process in step 2615.

When $T_{rr\_rsp}$ expires; that is, when no RR_ACK message is received after the RR_RSP message is transmitted, the SF is deleted as follows. When the SF parameter modification process is initiated by the network, the serving SFA 2630 recognizes the expiration of $T_{rr\_rsp}$ and simultaneously the anchor SFA/policy server 2640 recognizes the failure of the SF $p_{parame}$er modification process. Therefore, the anchor SFA/policy server 2640 proceeds with the networ$k_{\ init}$iated DSD process. In contrast, when the SF parameter modification process is initiated by the MS 2610, the anchor SFA/policy server 2640 recognizes the expiration of $T_{rr\_rsp}$ and thus carries out the network initiated DSD process. The SF deletion due to the $T_{rr\_rsp}$ timer expiration is now elucidated.

Figure 27:
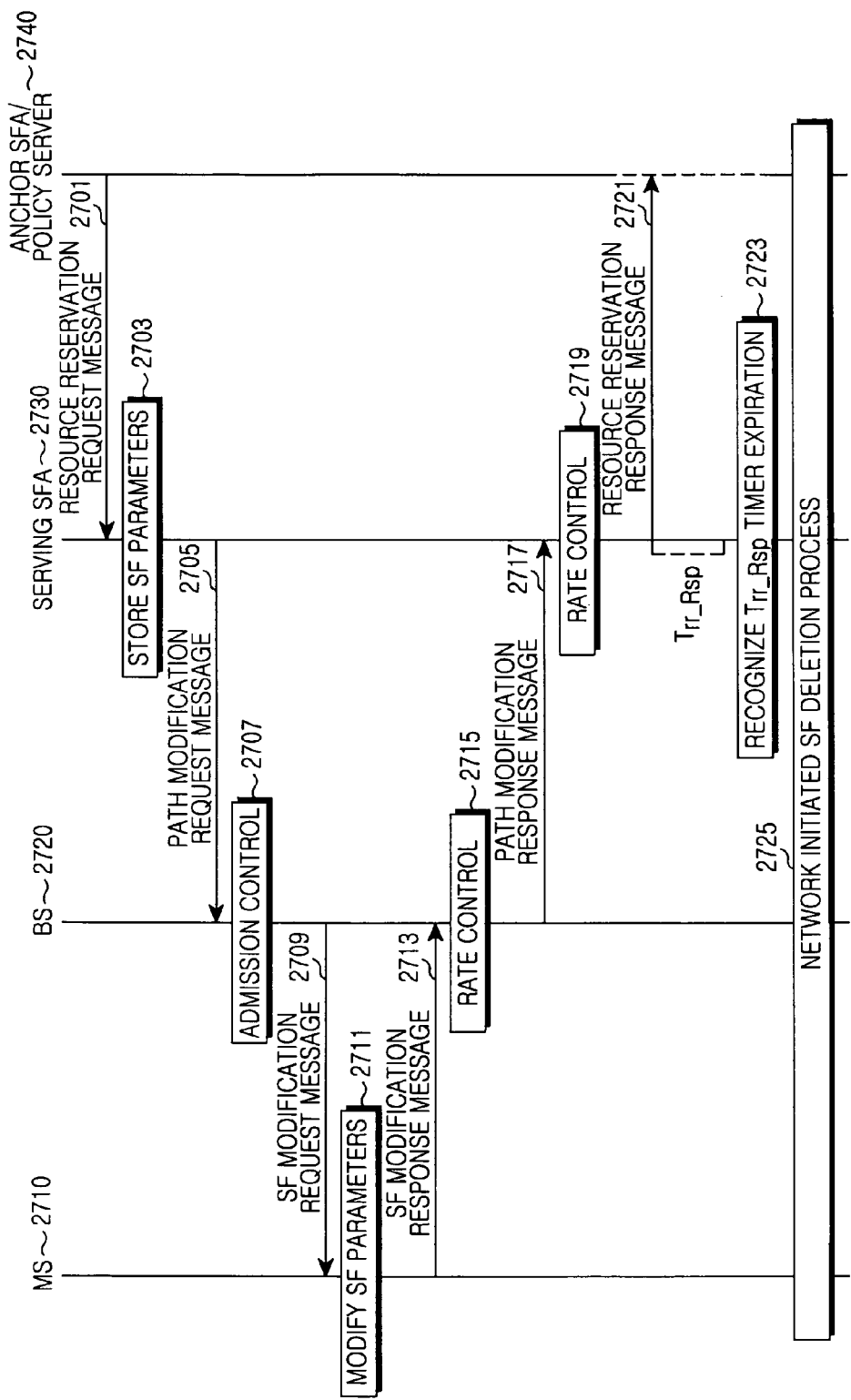

FIG. 27 shows the signal exchanges when the timer of $T_{rr\_rsp}$ is expired in the network initiated SF parameter modification. The anchor SFA/policy server 2740 sends the RR_REQ message in step 2701, and the serving SFA 2730 stores the SF parameters of the RR_REQ message in step 2703 and sends the Path_Modification_REQ message in step 2705. The BS 2720 performs the admission control in step 2707 and sends the SF modification request message in step 2709. The MS 2710 modifies the SF parameters according to the SF modification request message in step 2711 and sends the SF modification response message in step 2713. The BS 2720 performs the rate control based on the new SF parameters in step 2715 and sends the Path_Modification_RSP message in step 2717. The serving SFA 2730 performs the rate control in step 2719 and sends the RR_RSP message in step 2721. The serving SFA 2730 starts the timer $T_{rr\_rsp}$ at the same time as sending the RR_RSP message, and recognizes the expiration of the timer $T_{rr\_rsp}$ without receiving the RR_ACK in step 2723. Therefore, the anchor SFA/policy server 2740 recognizes the failure of the SF parameter modification process and carries out the network SF deletion process in step 2725.

Figure 28:
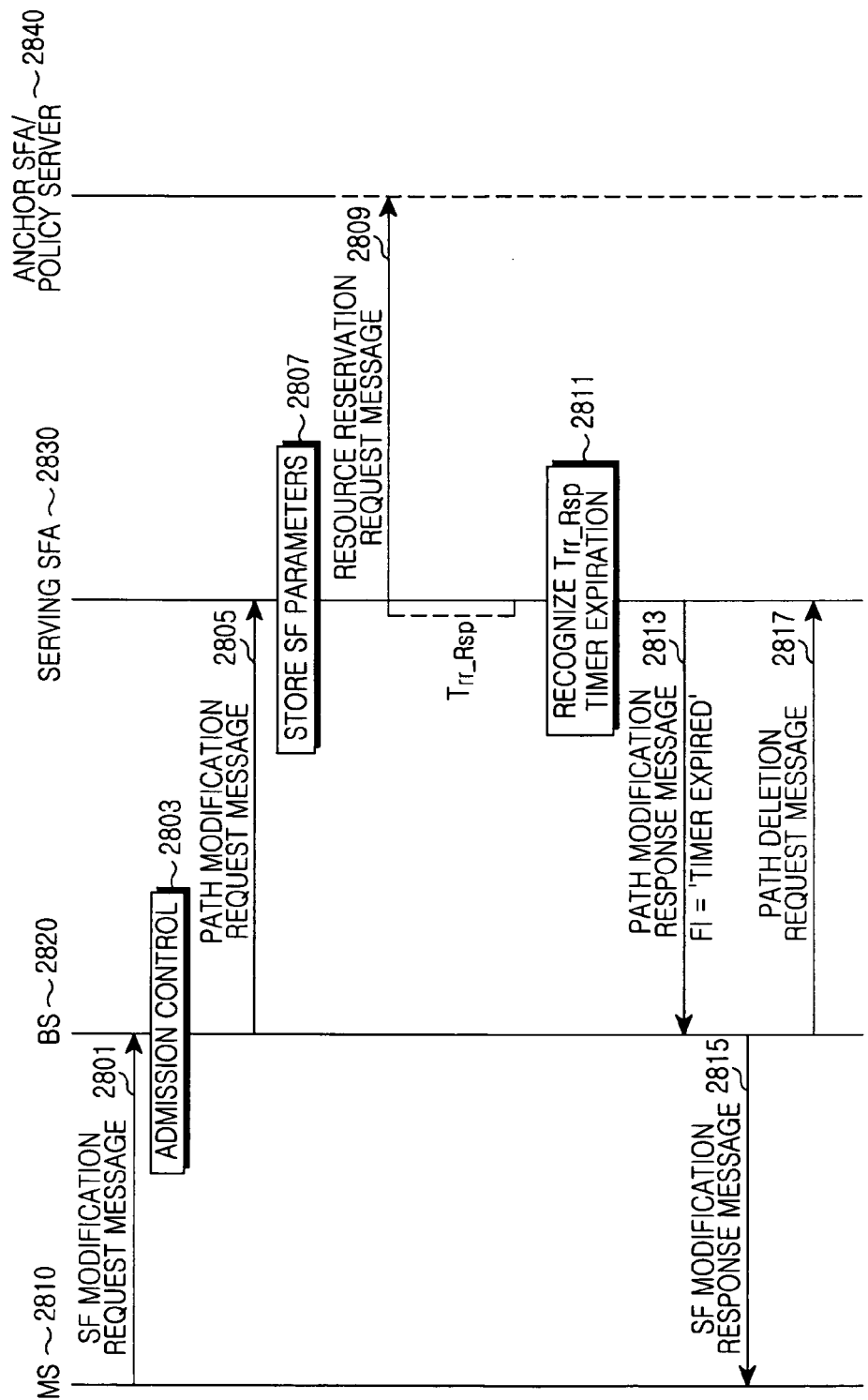

FIG. 28 shows the signal exchanges when the timer $T_{rr\_rsp}$ expires in the MS initiated SF parameter modification. The MS 2810 sends the SF modification request message in step 2801 and the BS 2820 performs the admission control based on the SF parameters of the SF modification request message in step 2803. Thereafter, the BS 2820 sends the Path_Modification_REQ message in step 2805. The serving SFA 2830 stores the SF parameters of the Path_Modification_REQ message in step 2807 and sends the RR_REQ message in step 2809. The serving SFA 2830 starts the timer $T_{rr\_req}$ at the same time as sending the RR_REQ message and recognizes the expiration of the timer $T_{rr\_req}$ without receiving the RR_RSP message in step 2811. Therefore, the serving SFA 2830 sends the Path_Modification_RSP message including the FI 'timer expired' in step 2813. The BS 2820 sends the SF modification response message including the CC 'reject other' or 'timer expired' in step 2815. Accordingly, the BS 2820 sends the SF deletion request message to the MS 2810 in step 2817 and sends the Path_Deletion_REQ message to the serving SFA in step 2819.

Figure 29:
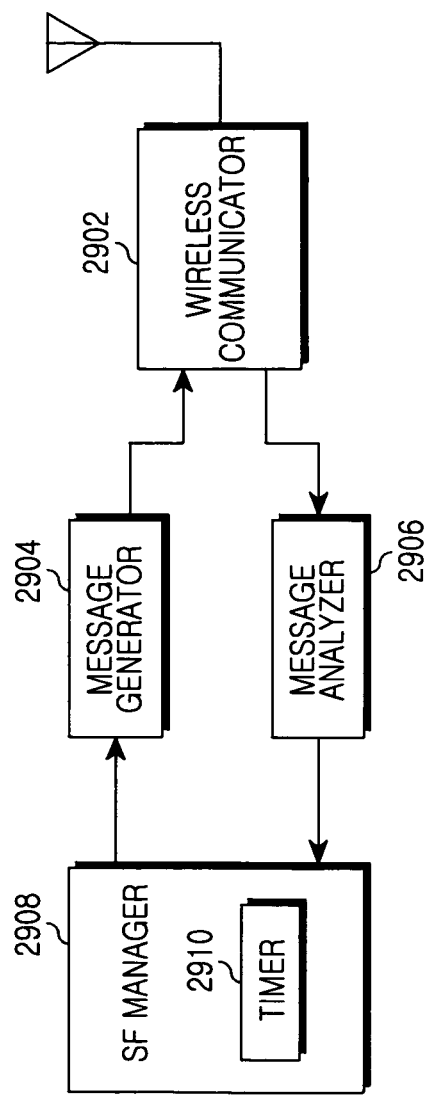
FIG. 29 illustrates the MS in the broadband wireless communication network according to an exemplary embodiment of the present invention.

FIG. 29 illustrates a block diagram of the MS in the broadband wireless communication network according to an exemplary embodiment of the present invention.

The MS of FIG. 29 includes a wireless communicator 2902, a message generator 2904, a message analyzer 2906, and an SF manager 2908.

The wireless communicator 2902 provides the interface for communicating with the BS over a radio channel. More specifically, the wireless communicator 2902 constitutes OFDM symbols from the transmit bit stream through encoding, modulation, and Inverse Fast Fourier Transform (IFFT) operation, and Cyclic Prefix (CP) insertion, up-converts the OFDM symbols to a Radio Frequency (RF) signal, and transmits the RF signal via an antenna. The wireless communicator 2902 down-converts an RF signal received via the antenna and recovers the receive bit stream from the OFDM symbols through CP elimination, FFT operation, demodulation, and decoding.

The message generator 2904 generates a control message to send to the BS. For example, the message generator 2904 generates messages for generating, deleting, and modifying the SF. The message generator 2904 generates the SF modification response message including the CC to inform of the error with respect to the SF parameter modification request. For instance, when there is no SF requested to modify, the message generator 2904 generates the SF modification response message including the CC 'Reject SF not Found'. When the timer $T_8$ or the timer $T_7$ expires, the message generator 2904 generates the SF deletion request message for the SF deletion process.

The message analyzer 2906 confirms the information in the control message by analyzing the control message received from the BS. For example, the message analyzer 2906 analyzes the messages for generating, deleting, and modifying the SE In particular, the message analyzer 2906 checks the error in the SF parameter modification process based on the CC of the SF modification response message or the SF modification ACK and provides the CC indicative of the error to the SF manager 2908.

The SF manager 2908 controls the functions for generating, modifying, and deleting the SF. When receiving the SF modification request message from the BS, the SF manager 2908 modifies the SF parameters of the corresponding SF. When there is no SF, the SF manager 2908 informs the message generator 2904 of the absence of the SF. When determining that the SF parameter modification is required, the SF manager 2908 modifies the SF parameters and then controls the message generator 2904 to generate the RR_REQ message. In particular, the SF manager 2908 controls the function for handing the error in the SF parameter modification process. More particularly, when receiving the SF modification response message including the CC 'Reject SF not Found' in relation to the SF requested to modify, the SF manager 2908 deletes the SE When receiving the SF modification ACK including the CC 'Reject Other' in relation to the SF completely modified according to the modification request, the SF manager 2908 restores the SF into the former state of the SF parameter modification request. The SF manager 2908 recognizes the error and controls the message generator 2904 to generate the control message corresponding to the error. The SF manager 2908 includes a timer 2910. The timer 2910 functions as the timer $T_7$ or the timer $T_8$ under the control of the SF manager 2908. More specifically, the timer 2910 acts as the timer $T_7$ when the SF modification request message is transmitted, and acts as the timer $T_8$ when the SF modification response message is transmitted. When the timer 2910 expires before the SF modification response message or the SF modification ACK is received, the SF manager 2908 controls the message generator 2904 to generate the SF deletion request message and proceeds with the SF deletion process.

Figure 30:
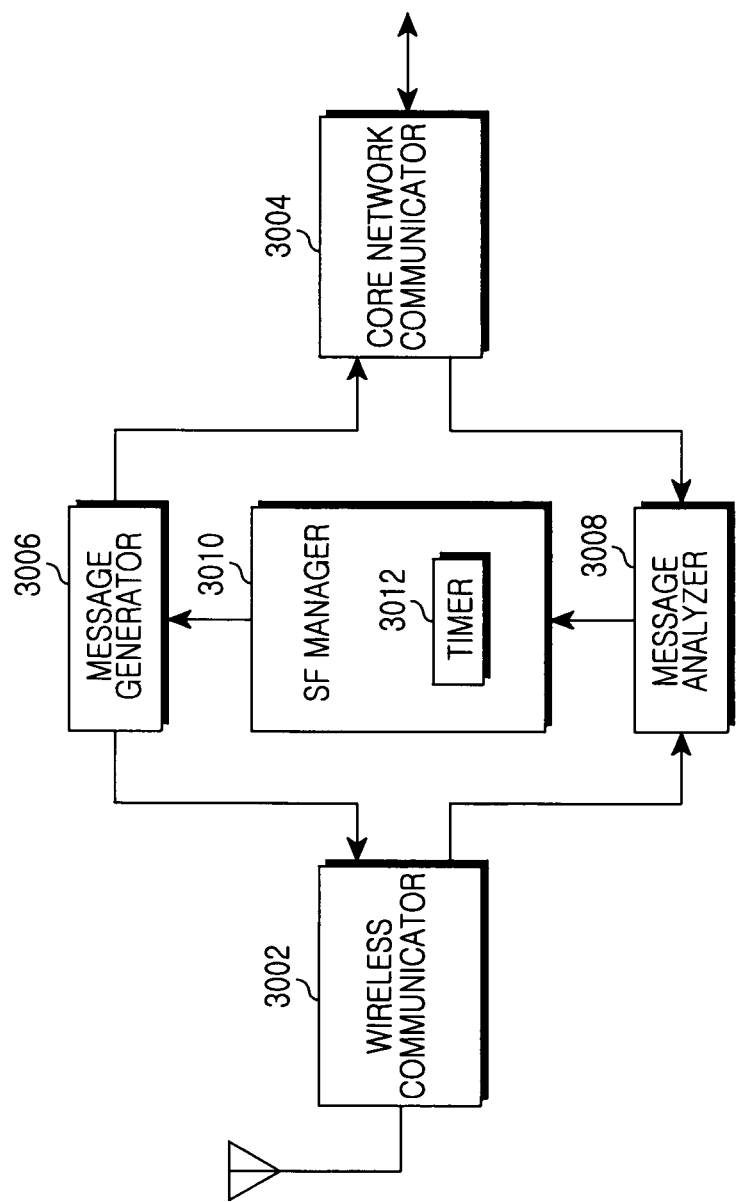
FIG. 30 illustrates a base station in the broadband wireless communication network according to an exemplary embodiment of the present invention.

FIG. 30 illustrates a block diagram of the BS in the broadband wireless communication network according to an exemplary embodiment of the present invention.

The BS of FIG. 30 includes a wireless communicator 3002, a core network communicator 3004, a message generator 3006, a message analyzer 3008, and an SF manager 3010.

The wireless communicator 3002 provides the interface for communicating with the MS over the radio channel. More specifically, the wireless communicator 3002 constitutes OFDM symbols from the transmit bit stream through encoding, modulation, IFFT operation, and CP insertion, up-converts the OFDM symbols to an RF signal, and transmits the RF signal via an antenna. The wireless communicator 3002 down-converts an RF signal received via the antenna and recovers the receive bit stream from the OFDM symbols through CP elimination, FFT operation, demodulation, and decoding.

The core network communicator 3004 provides the interface for communicating with the ASN-GW. That is, the core network communicator 3004 executes the conversion function between the bit stream and the physical signal in conformity to the communication standard with the ASN-GW.

The message generator 3006 generates control messages to send to the MS and the ASN-GW. For example, the message generator 3006 generates the messages for generating, deleting, and modifying the SF. The message generator 3006 generates the SF modification response message or the SF modification ACK informing of the error in response to the SF parameter modification request, and the Path_Modification_RSP message and the Path_Modification_ACK including the FI to inform of the error. For example, when there is no SF requested by the MS to modify or when the Path_Modification_RSP message including the FI 'Requested Context Unavailable' is received from the ASN-GW, the message generator 3006 generates the SF modification response message including the CC 'Reject SF not Found'. When there is no SF requested from the network to modify or when the SF modification response message informing of the absence of the SF; that is, including the CC 'Reject SF not Found' is received from the MS, the message generator 3006 generates the Path_Modification_RSP message including the FI 'Requested Context Unavailable'. When the admission control fails for the SF requested by the network to modify, the message generator 3006 generates the Path_Modification_RSP message including the FI 'No Resources'. When the SF modification response message including the CC indicative of the SF modification failure from the MS, the message generator 3006 generates the Path_Modification_RSP message including the FI 'Failure by rejection of MS'. When the recovery of the SF fails because of the system error of the BS, the message generator 3006 generates the Path_Modification_RSP message including the FI 'Unspecified Error'. When the recovery of the SF fails because of the system error of the BS or when the Path_Modification_RSP message including the FI 'Unspecified Error' is received from the ASN-GW, the message generator 3006 generates the SF modification ACK including 'Reject Other'. When the timer $T_7$ or the timer $T_8$ expires, the message generator 3006 generates the Path_Modification_RSP message including the FI 'timer expired'. When the timer $T_{path\_Req}$ expires or when the Path_Modification_RSP message including the FI 'timer expired' is received from the ASN-GW, the message generator 3006 generates the SF modification response message including the CC 'reject other' or 'timer expired', or generates the SF deletion request message and the Path_Deletion_REQ message. When the timer $T_{path\_Rsp}$ expires, the message generator 3006 generates the SF modification ACK including the CC 'reject other' or 'timer expired', or generates the SF deletion request message and the Path_Deletion_REQ message.

The message analyzer 3008 confirms the information in the control messages by analyzing the control messages received from the MS and the ASN-GW. For example, the message analyzer 3008 analyzes the messages for generating, deleting, and modifying the SE In particular, the message analyzer 3008 checks the error in the SF parameter modification process based on the CC of the SF modification response message or the SF modification ACK and the FI of the Path_Modification_RSP message and the Path_Modification_ACK, and provides the CC and the FI indicative of the error to the SF manager 3010.

The SF manager 3010 controls the functions for generating, modifying, and deleting the SF. The SF manager 3010 controls the function for handling the error in the SF parameter modification process. More specifically, when the SF modification response message including the CC 'Reject SF not Found' is received in relation to the SF requested by the network to modify or when the Path_Modification_RSP message including the FI 'Requested Context Unavailable' is received in relation to the SF requested by the MS to modify, the SF manager 3010 deletes the SF. When receiving the SF modification response message including the CC indicative of the SF modification failure in relation to the SF requested by the network to modify, the SF manager 3010 restores the SF to the former state of the SF parameter modification request. The SF manager 3010 recognizes the error and controls the message generator 3006 to generate the control message corresponding to the error. The SF manager 3010 includes a timer 3012. The timer 3012 functions as the timer $T_7$, the timer $T_8$, the timer $T_{path\_Req}$, and the timer $T_{path\_Rsp}$ under the control of the SF manager 3010. More specifically, the timer 3012 acts as the timer $T_7$ to send the SF modification request message, as the timer $T_8$ to send the SF modification response message, as the timer $T_{path\_Req}$ to send the Path_Modification_REQ message, and the timer $T_{path\_Rsp}$ to send the Path_Modification_RSP message. When the timer 3012 expires before the SF modification response message, the SF modification ACK, the Path_Modification_RSP message, the Path_Modification_ACK are received, the SF manager 3010 controls the message generator 3006 to generate the corresponding message.

Figure 31:
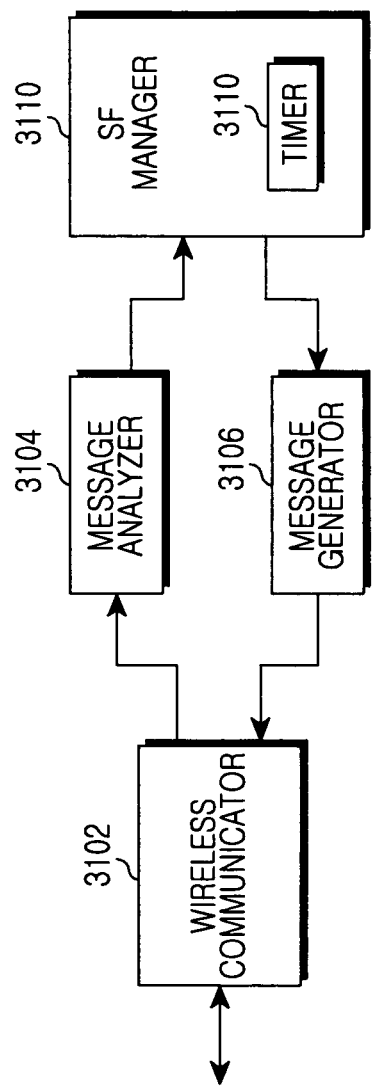
FIG. 31 illustrates an Access Service Network GateWay (ASN-GW) in the broadband wireless communication network according to an exemplary embodiment of the present invention.

FIG. 31 illustrates a block diagram of the ASN-GW in the broadband wireless communication network according to an exemplary embodiment of the present invention.

The ASN-GW of FIG. 31 includes a communicator 3102, a message analyzer 3104, a message generator 3106, and an SF manager 3108.

The communicator 3102 provides the interface for the communication between the BS and the ASN-GW. That is, the communicator 3102 executes the conversion function between the bit stream and the physical signal in conformity to the communication standard between the BS and the ASN-GW. The communicator 3102 sends and receives the Path_Modification_REQ message, the Path_Modification_RSP message, and the Path_Modification_ACK to and from the BS, and the RR_REQ message, the RR_RSP message, and the RR_ACK to and from the ASN-GW.

The message analyzer 3104 confirms the information in the control messages by analyzing the control messages received from the BS and the ASN-GW. For example, the message analyzer 3104 analyzes the messages for generating, deleting, and modifying the SF. In particular, the message analyzer 3104 checks the error in the SF parameter modification process based on the FI of the Path_Modification_RSP message, the Path_Modification_ACK, the RR_RSP message, and the RR_ACK and provides the FI indicative of the error to the SF manager 3108.

The message generator 3106 generates the control messages to send to the BS and the ASN-GW. For example, the message generator 3106 generates messages for generating, deleting, and modifying the SF. More specifically, the message generator 3106 generates the Path_Modification_RSP message, the Path_Modification_ACK, the RR_RSP message, or the RR_ACK including the FI indicative of the error in response to the SF parameter modification request. In so doing, the type of the generated message depends on whether the ASN-GW acts as the serving SFA or the anchor SFA.

When the ASN-GW acts as the serving SFA, the message generator 3106 operations as below. When there is no SF requested by the network to modify or when the Path_Modification_RSP message including the FI 'Requested Context Unavailable' is received from the BS, the message generator 3106 generates the RR_RSP message including the FI 'Requested Context Unavailable'. When there is no SF requested by the MS to modify or when the RR_RSP message including the FI 'Requested Context Unavailable' is received from the anchor SFA, the message generator 3106 generates the Path_Modification_RSP message including the FI 'Requested Context Unavailable'. When receiving the Path_Modification_RSP message including the FI 'No Resources' from the BS in relation to the SF requested by the network to modify, the message generator 3106 generates the RR_RSP message including the FI 'No Resources'. When receiving the Path_Modification_RSP message including the FI 'Failure by rejection of MS' from the BS in relation to the SF requested by the network to modify, the message generator 3106 generates the RR_RSP message including the FI 'Failure by rejection of MS'. When the Path_Modification_RSP message including the FI 'Unspecified Error' is received from the BS or when the SF recovery fails because of the system error, the message generator 3106 generates the RR_RSP message including the FI 'Unspecified Error'. When receiving the Path_Modification_RSP message including the FI 'timer expired' from the BS, the message generator 3106 generates the RR_RSP message including the FI 'timer expired'. When receiving the Path_Modification_ACK including the FI 'timer expired' from the BS, the message generator 3106 generates the RR_ACK including the FI 'timer expired'. The message generator 3106 generates the RR_RSP message including the FI 'timer expired' when the timer $T_{path\_Req}$ expires, generates the RR_ACK including the FI 'timer expired' when the timer $T_{path\_Rsp}$ expires, and generates the Path_Modification_RSP message including the FI 'timer expired' when the timer $T_{rr\_Req}$ expires.

When the ASN-GW serves as the anchor SFA, the message generator 3106 operates as below. When there is no SF requested by the MS to modify, the message generator 3106 generates the RR_RSP message including the FI 'Requested Context Unavailable'. When the RR_RSP message or the RR_ACK including the FI 'timer expired' is received, when the suspension of the SF parameter modification process due to the $T_{rr\_Rsp}$ expiration of the serving SFA is recognized, or when the timer $T_{rr\_Rsp}$ expires, the message generator 3106 generates the control message for the network initiated SF deletion process. When the timer $T_{rr\_Req}$ expires, the message generator 3106 generates the control message for the network exit process.

The SF manager 3108 controls the functions for the SF generation, modification, and deletion. The SF manager 3108 controls the function for handling the error in the SF parameter modification process. Operations of the SF manager 3108 rely on whether the ASN-GW acts as the serving SFA or the anchor SFA.

When the ASN-GW functions as the serving SFA, the SF manager 3108 operates as below. When receiving the Path_Modification_RSP message including the FI 'Requested Context Unavailable' from the BS or when receiving the RR_RSP message including the FI 'Requested Context Unavailable' from the anchor SFA, the SF manager 3108 deletes the corresponding SE When receiving the Path_Modification_RSP message including the FI 'No Resources' from the BS or when receiving the Path_Modification_RSP message including the FI 'Failure by rejection of MS' from the BS, the SF manager 3108 restores the corresponding SF to the former state of the SF parameter modification request. The SF manager 3108 recognizes the error and controls the message generator 3106 to generate the control message corresponding to the error. The SF manager 3108 includes a timer 3110. The timer 3110 serves as the timer $T_{path\_Req}$, the timer $T_{path\_Rsp}$, the timer $T_{rr\_Req}$, and the timer $T_{rr\_Rsp}$ under the control of the SF manager 3108. The timer 3110 functions as the timer $T_{path\_Req}$ to send the Path_Modification_REQ message, as the timer $T_{path\_Rsp}$ to send the Path_Modification_RSP message, as the timer $T_{rr\_Req}$ to send the RR_REQ message, and as the timer $T_{rr\_Rsp}$ to send the RR_RSP message. When the timer 3110 expires before receiving the Path_Modification_RSP message, the Path_Modification_ACK, the RR_RSP message, and the RR_ACK, the SF manager 3108 controls the message generator 3106 to generate the corresponding message.

When the ASN-GW serves as the anchor SFA, the SF manager 3108 operates as follows. When the RR_REQ message is received from the serving SFA, the SF manager 3108 modifies the SF parameters of the corresponding SF. At this time, when there is no SF, the SF manager 3108 informs the message generator 3106 of the absence of the SF. When determining that the SF parameter modification is needed, the SF manager 3108 modifies the SF parameters and then controls the message generator 3106 to generate the RR_REQ message. When receiving the RR_RSP message including the FI 'Requested Context Unavailable' from the serving SFA, the SF manager 3108 deletes the corresponding SF. When receiving the RR_RSP message including the FI 'No Resources' or 'Failure by rejection of MS' from the serving SFA, the SF manager 3108 recovers the corresponding SF to the former state of the SF parameter modification. When receiving the RR_RSP message including the FI 'Unspecified error' or 'timer expired' from the serving SFA, the SF manager 3108 proceeds with the network initiated SF deletion process. Next, the SF manager 3108 recognizes the error and controls the message generator 3106 to generate the control message corresponding to the error. The SF manager 3108 includes the timer 3110. The timer 3110 serves as the timer $T_{rr\_Req}$ and the timer $T_{rr\_Rsp}$ under the control of the SF manager 3108. The timer 3110 functions as the timer $T_{rr\_Req}$ to send the RR_REQ message and as the timer $T_{rr\_Rsp}$ to send the RR_RSP message. When the timer 3110 expires before receiving the RR_RSP message and the RR_ACK, the SF manager 3108 controls the message generator 3106 to generate the corresponding message. In further detail, when the suspension of the SF parameter modification process due to the $T_{rr\_Rsp}$ expiration of the serving SFA is recognized or when the timer $T_{rr\_Rsp}$ expires, the SF manager 3108 proceeds with the network initiated SF deletion process. When the timer $T_{rr\_Req}$ expires, the SF manager 3108 proceeds with the network exit process.

As set forth above, when the SF parameter modification process fails in the broadband wireless communication network, the SF is restored or deleted based on the particular reason of the failure. Therefore, although the SF parameter modification process fails, the system can be effectively operated without the SF information inconsistency.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A wireless communication network supporting a Mobile Station (MS) initiated Service Flow (SF) parameter modification process, the network comprising:
a base station (BS) configured to receive an SF modification request message to modify an SF from the MS, wherein the SF modification request message includes identification information indicating the SF to change and SF parameters of a Media Access Control layer, the BS configured to determine whether the BS has information regarding the SF, send a path modification request message to a serving Service Flow Authorization (SFA) when the BS has the information regarding the SF, and send an SF modification response message which comprises a Confirmation Code (CC) "Reject SF not found' to the MS when the BS does not have the information regarding the SF;
the serving SFA configured to determine whether the serving SFA has the information regarding the SF upon receiving the path modification request message, send a resource reservation request message to an anchor SFA when the serving SFA has the information regarding the SF, and send a path modification response message that comprises a Failure Indication (FI) 'Requested Context Unavailable' to the BS when the serving SFA does not have the information regarding the SF;
the anchor SFA configured to determine whether the anchor SFA has the information regarding the SF upon receiving the resource reservation request message, and send a resource reservation response message which comprises the H 'Requested Context Unavailable' to the serving SFA when the anchor SFA does not have the information regarding the SF; and
wherein the MS deletes the information on the SF when receiving the SF modification response message comprising the CC 'Reject RF not found' from the BS,
the BS deletes the information on the SF when receiving the path modification response message comprising the FI 'Requested Context Unavailable' from the serving SFA, and
the serving SFA deletes the information on the SF when receiving the resource reservation response message comprising the FI 'Requested Context Unavailable' from the anchor SFA.

2. The network of claim 1, wherein, when the SF modification succeeds, the anchor SFA sends a resource reservation response message informing of the success of the SF modification to the serving SFA, the serving SFA sends a path modification response message informing of the successful SF modification to the BS when receiving the resource reservation response message informing of the success of the SF modification, and the BS sends an SF modification response message informing of the successful SF modification to the MS when receiving the path modification response message informing of the successful SF modification.

3. The network of claim 2, wherein the MS starts a timer corresponding to the SF modification request message at the same time as sending the SF modification request message, and proceeds with an MS initiated SF deletion process when the timer expires before the SF modification response message is received from the BS.

4. The network of claim 2, wherein the BS sends an SF modification response message informing of the successful SF modification to the MS and simultaneously starts a timer corresponding to the SF modification response message when receiving the path modification response message informing of the successful SF modification from the serving SFA, and sends a path modification ACK comprising the FI 'timer expired' to the serving SFA when the timer expires before an SF modification ACK is received from the MS,
the serving SFA sends a resource reservation ACK including the FI 'timer expired' to the anchor SFA when receiving the path modification ACK comprising the FI 'timer expired, and
the anchor SFA proceeds with a network initiated SF deletion process when receiving the resource reservation ACK including the FI 'timer expired'.

5. The network of claim 2, wherein the BS sends the path modification request message and simultaneously starts a timer corresponding to the path modification request message, and sends an SF modification response message comprising the CC 'reject other' or 'timer expired' to the MS when the timer expires before the path modification response message is received from the serving SFA, and
the MS proceeds with an MS initiated SF deletion process when receiving the SF modification response message comprising the CC 'reject other' or 'timer expired'.

6. The network of claim 2, wherein the BS sends the path modification request message and simultaneously starts a timer corresponding to the path modification request message, and, sends an SF deletion request message for deleting the SF to the MS and a path deletion request message for deleting the SF to the serving SFA when the timer expires before the path modification response message is received from the serving SFA.

7. The network of claim 2, wherein the serving SFA sends the resource reservation request message and simultaneously starts a timer corresponding to the resource reservation request message, and sends a path modification response message comprising the FI 'timer expired' to the BS when the timer expires before the resource reservation response message is received,
the BS sends an SF modification response message comprising the CC 'reject other' or 'timer expired' to the MS when receiving the path modification response message comprising the FI 'timer expired', and the MS proceeds with an MS initiated SF deletion process when receiving the SF modification response message comprising the CC 'reject other' or 'timer expired'.

8. The network of claim 2, wherein the serving SFA sends the resource reservation request message and simultaneously starts a timer corresponding to the resource reservation request message, and sends a path modification response message comprising the FI 'timer expired' to the BS when the timer expires before the resource reservation response message is received, and the BS sends an SF deletion request message for deleting the SF to the MS and sends a path deletion request message for deleting the SF to the serving SFA when receiving the path modification response message comprising the FI 'timer expired'.

9. A method for an operation of a Mobile Station (MS) in a wireless communication network, the method comprising:

sending a Service Flow (SF) modification request message to a Base Station (BS) to modify an SF; and when the SF modification response message comprising a Confirmation Code (CC) 'Reject SF not found' is received from the BS before the timer expires, deleting information regarding the SF, and when the SF modification response is not received from the BS when the timer expires, deleting the information regarding the SF, the information regarding the SF comprising at least one of identification information indicating the SF to modify, bandwidth, bit error rate, and service type, IDs of the Network Entities (NEs) associated with the corresponding SF, and SF parameters, wherein when the SF modification response message which comprises the CC 'Reject SF not found' is received from the BS, the BS does not have the information regarding the SF.

10. The method of claim 9, further comprising:

starting a timer corresponding to the SF modification request message after sending the SF modification request message;

when the timer expires before an SF modification response message is received from the BS, proceeding with an MS initiated SF deletion process; and when the SF modification response message comprising the CC 'reject other' or 'timer expired' is received before the timer expires, proceeding with the MS initiated SF deletion process.

11. A method for an operation of a Base Station (BS) in a wireless communication network, the method comprising:

receiving a Service Flow (SF) modification request message to modify an SF from a Mobile Station (MS), determining whether the BS has information regarding a SF as a function of the SF modification request message, wherein the SF modification request message includes identification information indicating the SF to change and SF parameters of a Media Access Control layer;

when the BS has the information regarding the SF, sending a path modification request message to a serving Service Flow Authorization (SFA);

when the BS does not have the information regarding the SF, sending an SF modification response message which comprises a Confirmation Code (CC) 'Reject SF not found' to the MS;

upon receiving a path modification response message informing of the successful SF modification from the serving SFA, sending an SF modification response message informing of the successful SF modification to the MS and simultaneously starting a timer corresponding to the SF modification response message; and when the timer expires before an SF modification ACK is received from the MS, sending path modification ACK comprising an FI 'timer expired' to the serving SFA.

12. The method of claim 11, further comprising:

deleting the information on the SF when a path modification response message comprising a Failure Indication (FI) 'Requested Context Unavailable' is received from the serving SFA.

13. The method of claim 11, further comprising:

sending the path modification request message and simultaneously starting a timer corresponding to the path modification request message; and when the timer expires before the path modification response message is received from the serving SFA, or when a path modification response message comprising the FI 'timer expired' is received from the serving SFA before the timer expires, sending an SF modification response message comprising the CC 'reject other' or 'timer expired' to the MS.

14. The method of claim 11, further comprising:

upon receiving a path modification response message comprising the FI 'timer expired' from the serving SFA, sending an SF deletion request message for deleting the SF to the MS; and sending a path deletion request message for deleting the SF to the serving SFA.

15. A method for an operation of an Access Service Network Gateway (ASN-GW) that acts as a serving Service Flow Authorization (SFA) in a wireless communication network, the method comprising:

when receiving a path modification request message for modifying an SF from a Base Station (BS), determining whether the serving SFA has information regarding the SF, wherein the path modification request message includes identification information pointing to the SF to change, IDs of the Network Entities (NEs) associated with the corresponding SF, and SF parameters;

when the serving SFA has the information regarding the SF, sending a resource reservation request message to an anchor SFA;

when the serving SFA does not have the information regarding the SF, sending a path modification response message which comprises a Failure Indication (FI) 'Requested Context Unavailable' to the BS;

upon receiving a resource reservation response message informing of successful SF modification from the anchor SFA, sending a path modification response message informing of the successful SF modification to the BS and simultaneously starting a timer to the path modification response; and when the timer expires before a path modification ACK is received, sending a resource reservation ACK comprising the FI 'timer expired' to the anchor SFA.

16. The method of claim 15, further comprising:

upon receiving a resource reservation response message comprising the FI 'Requested Context Unavailable' from the anchor SFA, deleting the information on the SF.

17. The method of claim 15, further comprising:

upon receiving a path modification ACK comprising the FI 'timer expired' from the anchor SFA, sending a resource reservation ACK comprising an FI 'timer expired' to the anchor SFA.

18. The method of claim 15, further comprising:

starting a timer to the resource reservation request message, at the same time as sending the resource reservation request message; and when the timer expires before the resource reservation response message is received, sending a path modification response message comprising the FI 'timer expired' to the BS.

19. A method for an operation of an Access Service Network Gateway (ASN-GW) that acts as an anchor Service Flow Authorization (SFA) in a wireless communication network, the method comprising:
- when receiving a resource reservation request message for modifying an SF from a serving SFA, determining whether the anchor SFA has information regarding the SF, wherein the reservation request message includes information such as identification information indicating the SF to modify, bandwidth, bit error rate, and service type;
- when the anchor SFA does not have the information regarding the SF, sending a resource reservation response message comprising a Failure Indication (FI) 'Requested Context Unavailable' to the serving SFA;
- sending a resource reservation response message informing of successful SF modification and simultaneously starting a timer, corresponding the resource reservation response message; and
- when the timer expires before a resource reservation ACK is received from the serving SFA, performing a network initiated SF deletion process.

20. The method of claim 19, further comprising:
- when a resource reservation ACK comprising the FI 'timer expired' is received from the serving SFA, performing a network initiated SF deletion process.

* * * * *